(12) United States Patent
Bryar et al.

(10) Patent No.: US 7,890,850 B1
(45) Date of Patent: Feb. 15, 2011

(54) METHOD AND SYSTEM FOR DISPLAYING A HYPERLINK AT MULTIPLE LEVELS OF PROMINENCE BASED ON USER INTERACTION

(75) Inventors: Colin M. Bryar, Seattle, WA (US); Lawrence G. Tesler, Portola Valley, CA (US); Jeffrey P. Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/248,829

(22) Filed: Oct. 9, 2008

Related U.S. Application Data

(63) Continuation of application No. 11/012,880, filed on Dec. 15, 2004, now Pat. No. 7,467,349.

(51) Int. Cl.
*G06F 17/00* (2006.01)

(52) U.S. Cl. .............. 715/207; 715/200; 715/201; 715/202; 715/203; 715/204; 715/205; 715/206; 715/208; 715/234; 715/745; 715/760

(58) Field of Classification Search ......... 715/200–204, 715/234, 745, 760
See application file for complete search history.

(56) References Cited

U.S. PATENT DOCUMENTS

| | | | |
|---|---|---|---|
| 5,581,670 A | 12/1996 | Bier | |
| 5,617,114 A | 4/1997 | Bier | |
| 5,729,704 A | 3/1998 | Stone | |
| 5,946,678 A | 8/1999 | Aalbersberg | |
| 5,970,455 A | 10/1999 | Wilcox | |
| 6,154,752 A | 11/2000 | Ryan | |
| 6,279,014 B1 | 8/2001 | Schilit | |
| 6,285,999 B1 | 9/2001 | Page | |
| 6,446,095 B1 | 9/2002 | Mukai | |
| 6,529,023 B2 | 3/2003 | Becker | |
| 6,557,015 B1 | 4/2003 | Bates | |
| 6,799,176 B1 | 9/2004 | Page | |
| 6,816,851 B1 | 11/2004 | Olsson | |
| 6,839,702 B1 | 1/2005 | Patel | |

(Continued)

OTHER PUBLICATIONS

"43 Things," <http://www.43things.com/> [retrieved Jul. 11, 2005], pp. 1-2.

(Continued)

*Primary Examiner*—Stephen S Hong
*Assistant Examiner*—David Faber
(74) *Attorney, Agent, or Firm*—Christensen O'Connor Johnson Kindness PLLC

(57) ABSTRACT

Prominence data resulting from user interaction with a hyperlink on a page may be stored in one or more repositories. Prominence data may be collected automatically when the user views a page or clicks on a hyperlink without requiring separate action from the user to accomplish storage or retrieval. The prominence data may further include a display parameter that denotes a level of prominence that is usable to affect the display of a hyperlink. A prominence score used to determine the display parameter may be calculated by dividing a count of click-throughs by a count of page views of the page containing the hyperlink. Other score calculations may be used. User feedback may be incorporated into the score calculation and may be collected through a toolbar, popup window, or other feedback-collecting mechanism.

31 Claims, 11 Drawing Sheets

U.S. PATENT DOCUMENTS

| | | | |
|---|---|---|---|
| 6,859,909 | B1 | 2/2005 | Lerner |
| 6,900,819 | B2 | 5/2005 | Marshall |
| 7,113,935 | B2 | 9/2006 | Saxena |
| 7,330,787 | B2 | 2/2008 | Agrawala |
| 2002/0010757 | A1 | 1/2002 | Granik |
| 2002/0075302 | A1 | 6/2002 | Simchik |
| 2002/0196273 | A1 | 12/2002 | Krause |
| 2002/0198979 | A1 | 12/2002 | Yu |
| 2003/0050927 | A1 | 3/2003 | Hussam |
| 2003/0149938 | A1* | 8/2003 | McElfresh et al. .......... 715/517 |
| 2004/0001087 | A1 | 1/2004 | Warmus |
| 2004/0019688 | A1* | 1/2004 | Nickerson et al. .......... 709/229 |
| 2004/0059997 | A1 | 3/2004 | Allen |
| 2004/0194021 | A1 | 9/2004 | Marshall |
| 2004/0205575 | A1 | 10/2004 | Wattenberg |

OTHER PUBLICATIONS

"About the Alexa Traffic Rankings," <http://web.archive.org/web/20031002005825/http://pages.alexa.com/prod.serv/traffic_learn_more.html> [retrieved Nov. 28, 2007], 3 pages.

"Audioscrobbler Browser0.2," <http://www.pmbrowser.info/audioscrobbler.html> [retrieved Jul. 11, 2005], 1 page.

"BookManager Library Reader for Windows: Online Reference," <http://publib.boulder.ibm.com/cgi-bin/bookmgr/ BOOKS/ejrl3m00/FIRST?DT=19940811000506&SHE...> [retrieved Mar. 15, 2005], 1 page.

Edwards, M., and S. Roberts, "Reusing Internet Explorer and the WebBrowser Control: An Array of Options," MSDN.com, Jul. 30, 1998, <http://msdn2.microsft.com/en-us/library/bb250464(printer).aspx> [retrieved Feb. 20, 2008], pp. 1-8.

"Everything Burns," <http://jimfl.tensegrity.net/zeitgeist/> [retrieved Jul. 11, 2005], 1 page.

"Glossary Glossary of Terms and Abbreviations," BookManager Library Reader for Windows: Online Reference, <http://publib.boulder.ibm.com/cgi-bin/bookmgr/BOOKS/ejrl3m00/GLOSSARY?DN=SC34-3066-00&...> [retrieved Mar. 15, 2005], 1 page.

Jeanson, R., et al., "Pheromone Trail Decay Rates on Different Substrates in the Pharaoh's Ant, Monomorium Pharaonis," Physiological Entomology 28:192-198, 2003.

"Metadata Visualization," <http://ichris.ws/node/795> [retrieved Jul. 11, 2005], pp. 1-2.

"MovableTypeZeitgeistPlugin," <http://twiki.tensegrity.net/bin/view/Main/MovableTypeZeitgeistPlugin> [retrieved Jul. 11, 2005], pp. 1-2.

"NetLibrary eBook Reader: eBook Software," © 2005 BinaryThing Pty. Ltd., <http://www.planetebook.com/mainpage.asp?webpageid=15&TBToolID=1069> [retrieved Jun. 14, 2006], pp. 1-2.

"Planet Ebook," <http://www.planetebook.com/mainpage.asp?webpageid=15&TBToolID=1069> [retrieved Mar. 7, 2007], pp. 1-2.

"Section S," of BookManager Library Reader for Windows: Online Reference, <http://publib.boulder.ibm.com/cgi-bin/bookmgr/BOOKS/ejrl3m00/GLOSSARY?FS=TRUE&SHELF=...> [retrieved Mar. 15, 2005], pp. 1-5.

"Tags," <http://www.flickr.com/photos/tags/> [retrieved Jul. 11, 2005], pp. 1-2.

"TouchGraph LLC," <http://www.touchgraph.com/> [retrieved Jul. 11, 2005], 3 pages.

"Unique Click," Email Marketing Glossary, Forty Two Int'l, <http://web.archive.org/web/20040822045541/http://www.campaignmaster.com.au/glossary/email_marketing_unique_click.htm> [retrieved Nov. 28, 2007], 2 pages.

"'Death Squads' Hunted," CNN.com, published as early as Mar. 31, 2003, <http://web.archive.org/web/20030331131808/pttp://www.cnn.com . . . > [retrieved Aug. 25, 2008], 2 pages.

* cited by examiner

METHOD AND SYSTEM FOR DISPLAYING A HYPERLINK AT MULTIPLE LEVELS OF PROMINENCE BASED ON USER INTERACTION

CROSS-REFERENCE TO RELATED APPLICATION

This application is a continuation of U.S. patent application Ser. No. 11/012,880, filed Dec. 15, 2004, the priority of the filing date of which is hereby claimed, and the entire disclosure of which is hereby incorporated by reference.

BACKGROUND

Computer networks are well known for providing communication between different computing systems to enable one system to share information with another system. For example, a computer system may store information in pages. Such pages may include, but are not limited to, Web pages, documents, files, etc. that are stored or generated dynamically on local or remote computing systems. Pages are often accessed in reference to a Uniform Resource Identifier ("URI"), such as by entering a Uniform Resource Locator ("URL") into a Web browser. Pages may also be accessed by sending a File Transfer Protocol ("FTP") command, or otherwise invoking a computer process to obtain access to a page. In circumstances where a computer network is involved, a client system can access pages using a network address that identifies the desired page in the computer network. Computer networks range from local area networks to wide area networks to global networks including the Internet. The Internet, in particular, enables users to access a large number of pages.

In the realm of the World Wide Web ("the Web"), typical computer users access Web pages by instructing a browser operating at their local client computer to transmit a request for a Web page using a URL. Domain name servers direct the Web page request to one or more server computers that correspond to the network domain identified in the URL. When the server computers receive the Web page request, the server computers transmit markup code that embodies the Web page to the client computer of requesting user. The user's browser receives the markup code and displays the Web page to the user.

Pages transmitted to users often include various hyperlinks that point to or link to network addresses of other pages. Such pages may contain large numbers of hyperlinks, with many of the hyperlinks previously unseen by the user. If a page includes a description of the content linked to by the hyperlinks, it will usually be short and may not be detailed enough to help the user determine which, if any, of the hyperlinks will likely be helpful or useful to select or "click-through" in order to visit the linked-to page.

Some browser application programs are configured to change the color of a hyperlink when the user has previously clicked through the hyperlink. For example, a browser application may display a hyperlink in purple to indicate the hyperlink has previously been clicked through by the user. If the user has not previously clicked through a hyperlink, the browser displays the hyperlink in another color (e.g., blue). Because of the large number of hyperlinks available on typical Web pages, users may find it very difficult to identify which hyperlinks are more likely to be useful to them based only on a brief description (if any) and whether or not they have previously clicked through the hyperlink. This same problem occurs with most "history" or "favorites" lists provided by application programs, because the hyperlinks provided in such lists are typically not differentiated from each other when displayed to the user. After a list of hyperlinks grows beyond a certain size, the user may not be able to remember which hyperlinks have been helpful in the past and which hyperlinks are less useful or are no longer used.

Given the problems and shortcomings noted above, it is apparent that a method and system that helps users identify which hyperlinks have been used more frequently in the past or are considered more helpful or useful will have significant benefits, particularly if the systems and methods require minimal or no effort on the part of the user.

SUMMARY

Disclosed herein are systems and methods that enable hyperlinks to be displayed at various levels of prominence based on prior interaction of one or more users with the hyperlinks. For example, one exemplary embodiment disclosed herein uses an identity of a page and an identity of a user or group of users accessing the page to obtain information concerning prior user interaction with hyperlinks on the page. A score is calculated based on the user interaction information, and the score is used to determine a parameter that affects a display of the hyperlink.

Prominence data, which may include user interaction information, calculated score(s), and/or determined parameter(s), may be stored in one or more repositories for retrieval. Prominence data may further be aggregated to encompass user interaction information from multiple users. Examples of user interaction with a hyperlink or a page or resource associated with the hyperlink may include, without limitation, a number of times a page has been viewed, a number of times that hyperlinks on the page have been clicked through, user feedback about the hyperlinks, etc. Embodiments that calculate one or more scores based on the user interaction information may use the scores to determine parameters that affect a display of the hyperlinks at various levels of prominence.

In some embodiments, user interaction information, such as feedback, click-through, and page view data, may be stored in association with a user's individual or group identity and the identity of the page that contains the hyperlink. In circumstances where the user accesses the page at a later time, the prominence data for hyperlinks on the page can be automatically retrieved and used to determine the parameters that affect the display of the hyperlinks at various levels of prominence. By way of illustration, without limitation, the prominence of a hyperlink may be denoted by varying the size, font, brightness, color, progression or motion, or other static or dynamic display characteristic of the hyperlink.

Feedback may be received from a user in many forms. For example, a user may vote for or against a hyperlink (e.g., as to the hyperlink being helpful or useful). In other embodiments, a user may provide a numerical or other rating of the hyperlink, a percentage value based on the utility of the clicked hyperlink, or some other form of feedback that can be used later when determining and denoting hyperlink prominence. If desired, a feedback interface may remain available to the user throughout the time in which the page linked by the clicked hyperlink is provided to the user. Feedback received from the user may be stored with other prominence data.

One exemplary implementation uses a toolbar that appears on a display to a user. The toolbar may be configured to cooperate with an application, such as a Web browser, to obtain prominence data and determine display parameters for hyperlinks when pages are being accessed by the Web browser. The toolbar may also include a feedback interface, such as voting buttons for example that allow the user to vote for or against a hyperlink that the user has clicked through. In other embodiments, the toolbar may allow users to enter a number within a range of numbers, one through ten for example, to rate the hyperlink. In yet other embodiments, the toolbar may enable the user to enter a percentage value, where the percentage correlates with the usefulness of the content linked by the clicked hyperlink.

Feedback may be automatically stored, e.g., when a page linked by a clicked hyperlink is no longer being provided to the user. For example, user-entered feedback associated with a hyperlink may be automatically stored when the user navigates from the current page to a new page at a different address. Feedback may also be automatically stored at the time the feedback is entered by the user.

In some circumstances, prominence data may be obtained and stored on a page by page basis. The prominence data for each hyperlink in a page is stored in association with an identity of the page, such as the network address of the page. If desired, prominence data may be stored in association with a portion of the network address of the page, rather than the entire network address which may include session-specific data or other information particular to the instance when the user is accessing the page. Computer processes described herein may analyze the network address of the page to parse out a uniquely-identifying portion of the network address of the page that excludes such session-specific data.

In other circumstances, prominence data can be obtained and stored individually for different individual resources. For example, in a network environment, there may be many page servers providing pages to users wherein each of the pages includes a hyperlink pointing to the same network address of a resource. User interaction with links that all point to the same network address can be aggregated and stored in association with the network address of the linked resource. This allows user interaction information (such as "click-through" data, for example) to be aggregated for the particular resource at the network address across all of the pages having links pointing to or targeting that resource.

In another aspect of this disclosure, a computer system is described for generating, modifying, or otherwise affecting the prominence of display of a hyperlink. The computer system may include a prominence database (e.g., one or more repositories of prominence data) and a prominence server in communication with the prominence database. In one embodiment, the prominence server is configured to receive an identity of a page, retrieve prominence data associated with a hyperlink in the page from the prominence database, and determine one or more parameters that are usable to facilitate a display of the hyperlinks at various levels of prominence when the page is displayed. The prominence server may be further configured to receive prominence data, which may include user interaction information such as a count of page views, click-throughs, user-provided feedback, etc., for the hyperlinks on the page. The prominence data may be stored in the prominence database in association with the user or user's group identity and the identity of the page.

The prominence server may receive the identity of a page from either the user or from another source. For example, a user may request a page by transmitting a network address of the page to a page server, and at the same or subsequent time, transmit the network address to the prominence server. In such case, the prominence server may receive the network address of the page contemporaneously with time the page server receives the network address. The prominence server may respond by delivering a parameter to the computer of the requesting user, which may occur contemporaneously with time the page server provides the page to the requesting user. The requesting user's computer then presents the page to the user, with the hyperlinks on the page being displayed in accordance with the parameter.

Alternatively, the prominence server may act as an intermediary between the user's computer and the page server. The prominence server receives a request for a page from the user, and while retrieving prominence data associated with the page, the prominence server obtains the requested page from the page server. The prominence server then modifies the display configuration of one or more hyperlinks on the page in accordance with the parameter determined from the prominence data, and delivers the modified page to the user.

In yet another aspect, the prominence server may act as a service provider to page servers. Before delivering a page to a user, a page server may request prominence data from the prominence server. The prominence server provides the prominence data in a form that is usable by the page server or the requesting user's computer to affect the prominence of display of one or more hyperlinks on the page that the page server delivers to the user.

In yet another aspect, computer-accessible media may be provided with contents that direct a computing system to operate in accordance with the methods and systems described herein.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
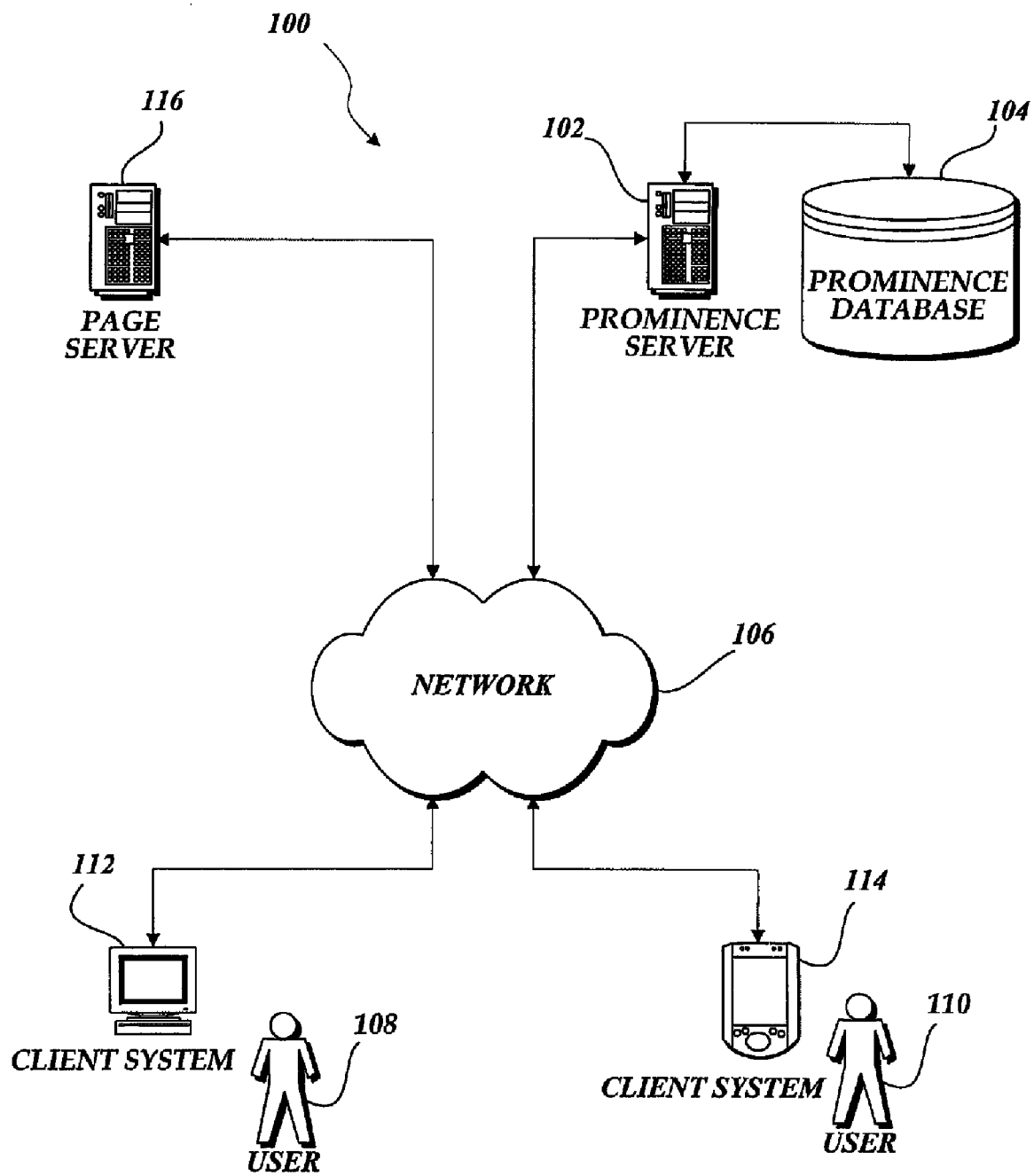
FIG. 1 is a pictorial diagram showing one exemplary environment in which embodiments of the invention may be implemented.

FIG. 1 provides an exemplary overview of one computing environment 100 in which embodiments of the invention may be implemented. The depicted environment includes a page server 116 and one or more client systems 112, 114 communicatively connected by a network 106. The client system 112 is shown associated with a user 108, while the client system 114 is shown associated with a user 110.

Further depicted in FIG. 1 is a prominence server 102 that is communicatively connected by the network 106 to the client systems 112, 114 and to the page server 116. The prominence server 102 is also shown with a direct communication link to a prominence database 104.

As will be described below in regard to exemplary embodiments of the invention, the page server 116 (which may be one of many, many page servers connected to the network 106) is configured to provide one or more pages to the users 108, 110 that are operating the client systems 112, 114, respectively. The pages stored on the page server 116 are addressable by a network address that identifies the particular pages in the network. Such pages may include, but are not limited to, Web pages, files, documents, media streams, etc., that are located or generated dynamically on a computing system that is local or remote to the page server.

It should be understood that the term "network address" used in connection with different exemplary embodiments of the invention herein may refer to any address or identifier that identifies a page on a computing system. The page may be located on a local computing system and thus identified by a local address (e.g., drive identifier and file identifier). The page may be located on a remote computing system and thus identified by a remote computer address (e.g., network domain identifier and file identifier). Appropriate page-specific identifiers may also be simply embedded or otherwise associated with the pages. Additionally, "pages" as described herein may include drop-down lists, such as the "Favorites" and "History" lists provided by web browsers and other application programs, which may be displayed by invoking a program vector, command, or computer program instruction. Drop-down lists of this type are typically stored on a user's local computer, but alternatively may be stored on a remote computer.

A user, such as user 108, may operate a client system, such as client system 112, to request a page from the page server 116 via the network 106. The network 106 may be a Local Area Network ("LAN"), a larger network such as a Wide Area Network ("WAN"), or a collection of networks, such as the Internet. Protocols for network communication, such as TCP/IP, are well known to those skilled in the art of computer networks. As further described herein, the user 108 may also operate the client system 112 to click on hyperlinks and communicate feedback to the prominence server 102. Prominence data stored in the prominence database 104 may be later retrieved and used to determine a parameter used to denote the prominence of a hyperlink displayed to the user.

As will be appreciated by those skilled in the art and others, FIG. 1 provides a simplified example of just one suitable computing environment for implementing embodiments of the present invention, and does not limit the invention thereto. In some embodiments, the computing systems shown, e.g., the page server 116, the client systems 112, 114, and/or the prominence server 102, may be implemented in a single computing system and thus not require network protocols for communication between the combined systems.

Also discussed herein are examples in which prominence data (which may include various user interaction information and/or parameters determined therefrom) are stored and retrieved from a prominence database 104. It should be understood and appreciated that the prominence database 104, in practice, may represent multiple repositories of information that may reside in multiple computer systems that are possibly remote from each other and unrelated to each other. Moreover, from the standpoint of the repositories, the information in the multiple repositories may not be considered "prominence data", but may be retrieved and used in accordance with principles of the invention to determine scores and/or parameters that affect the display of hyperlinks at various levels of prominence. The information may be specially stored in the repositories for this purpose, or may be ordinary data collected for other purposes. Such data may, for example, be retrieved on-the-fly in accordance with principles of the invention when prominence data is required.

When software formed in accordance with the invention is implemented in one or more computer systems, for example of the type illustrated in FIG. 1, the computer systems provide a way for users to access pages, retrieve previously-stored prominence data for hyperlinks in these pages, click-through hyperlinks, and record feedback relative to the clicked hyperlinks. Displaying hyperlinks at various levels of prominence enhances the user's computing experience by visually identifying those links that may be more helpful or useful to the user.

Figure 2:
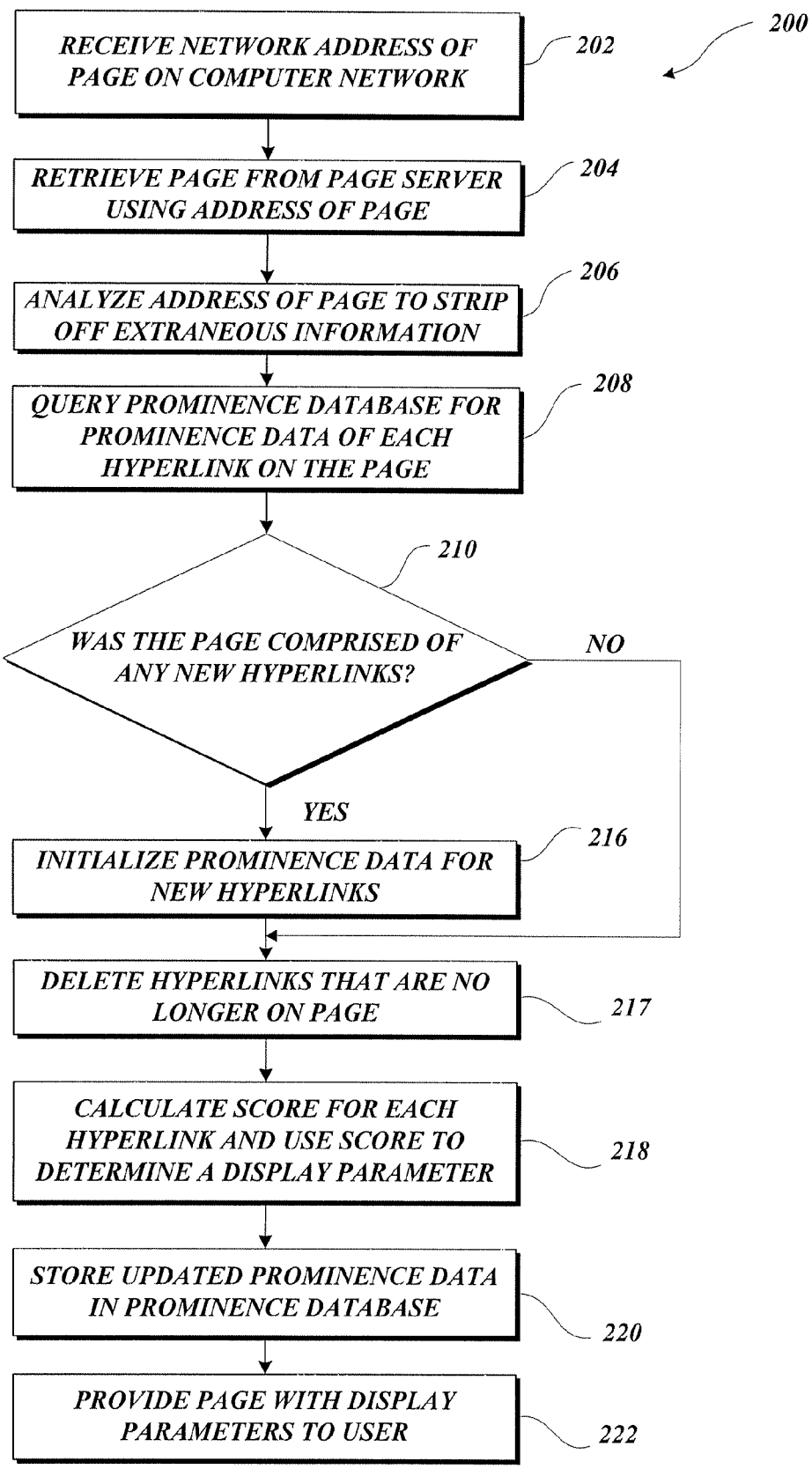
FIG. 2 is a flow diagram of one exemplary method for retrieval of prominence data associated with hyperlinks in a page on a computer network.
Figure 3:
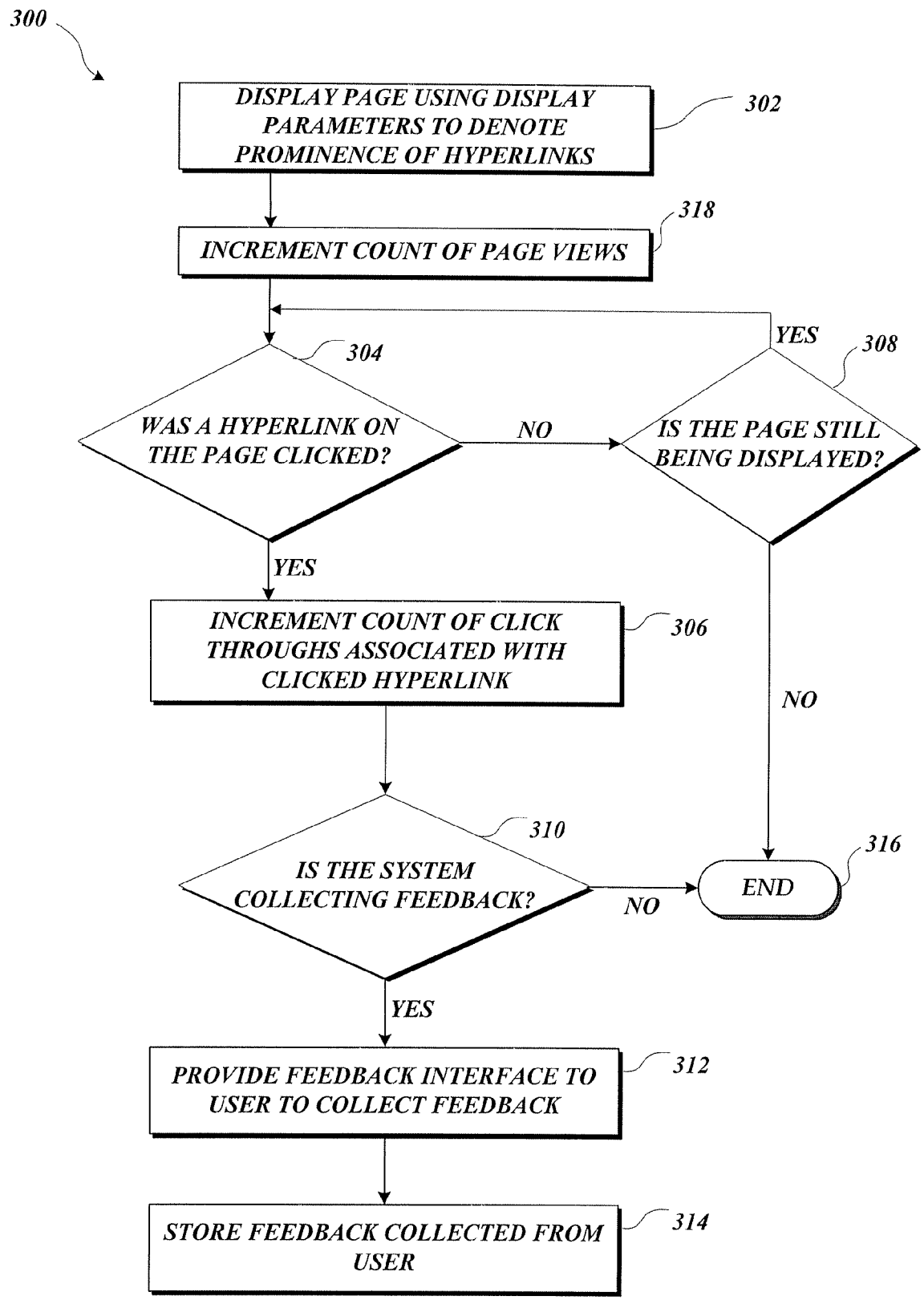
FIG. 3 is a flow diagram of one exemplary method for display of hyperlinks and storage of prominence data provided in association with hyperlinks in a page.

Prior to discussing exemplary computer architectures for implementing a client system, page server, and prominence server as depicted in FIG. 1, a discussion of exemplary methods for implementing embodiments of the invention is provided. FIGS. 2 and 3 are flow diagrams of exemplary methods 200 and 300 used to store and retrieve prominence data associated with hyperlinks on a page, and determine parameters for display of the page in accordance with the prominence data.

The method 200 of FIG. 2 begins at block 202 by receiving an identity of a page, such as a network address of a page, on a computer network. The network address may be received directly from the client system of the user (or a proxy server representing the client system) or it may be received from a page server that has received a request for a page from the user. For example, the client system 112 may request a page from the page server 116 by transmitting the network address of the page to the page server 116. Contemporaneously, the client system 112 may transmit the network address to the prominence server 102. In other embodiments, the client system 112 may communicate only with the page server 116, and the page server 116 may in turn communicate the network address of the requested page to the prominence server 102 with an identity of the user that is to receive the page. In either case, the prominence server 102 uses prominence data from the prominence database 104 to determine one or more display parameters for hyperlinks on the requested page, and communicates the display parameters to the client system 112.

In yet other embodiments, the client system 112 may communicate only with the prominence server 102. In that case, the prominence server 102 requests the page from the page server 116, uses prominence data from the prominence database 104 to determine one or more display parameters for hyperlinks on the page, and then delivers the requested page and display parameters to the client system 112 for displaying the page to the user. Alternatively, the prominence server 102 may modify the requested page with the display parameters and deliver the modified page to the user.

As will be described herein, in some embodiments, the method 200 may query the prominence database 104 for prominence data associated with each hyperlink currently on the page. To do this, a copy of the page may need to be retrieved from the page server 116, as indicated in block 204. Prominence data for each of the hyperlinks on the page may already be stored in the prominence database 104. However, depending on the process used to update the prominence database 104, the page may include hyperlinks that do not yet have prominence data associated therewith in the prominence database 104. For example, hyperlinks that were recently added to the page may not have been added yet to the prominence database 104. Therefore, as will be described below, the method 200 may query the prominence database 104 for prominence data associated with each hyperlink on the page, and add any hyperlinks in the page that are not found in the prominence database 104 to the prominence database 104.

In other embodiments, the method 200 may use the analyzed address from block 206 (discussed below) to query the prominence database 104 for only those hyperlinks which are already in the prominence database 104. In that case, the page would not need to be retrieved from the page server 116 before querying the prominence database 104, and block 204 may be skipped. If block 204 is skipped, hyperlinks on the page that are not in the prominence database 104 may be added at another time, possibly at another point within method 300 for example.

Once the network address of the page is received, e.g., by the prominence server 102, one or more computer processes operating at the prominence server 102 may analyze the address of the page to strip off extraneous information, as indicated in block 206. As will be understood from the description herein, prominence data associated with a hyperlink may be stored in connection with all or some of the network address of the page on which the hyperlink is found. In the embodiment illustrated in FIG. 2, prominence data associated with a hyperlink is stored in association with a portion of the network address that can still serve to identify the page in the network.

A requested page may be a Web page, for example, located by a network address in the form of a URL. In the example shown in FIG. 6, the client system 112 (or a proxy server operating with the client system 112) communicates the URL "www.xwebdomain.com/session?id=2" to a page server at www.xwebdomain.com using hypertext transfer protocol. In this example, the URL contains session-identifying information particular to a user that is not necessary to identify the requested Web page in the network. This URL is parsed by the computer process referenced in block 206 to identify the portion of the address that uniquely identifies the Web page but without the session-specific information, which in this example may be "www.xwebdomain.com". The identifying portion of the address could also be further reduced to "xwebdomain.com" so that prominence data for "www1.xwebdomain.com", "www2.xwebdomain.com", etc., are all aggregated under the same identifier. In other embodiments, the entire network address (e.g., entire URL or other computer address), or a different portion of the network address, may be used for storing and retrieving prominence data.

Returning to FIG. 2, once the address of the page is parsed to obtain a shorter but uniquely-identifying portion, the identifying portion is used to query a prominence database 104 (block 208) to determine whether the user or any groups to which the user belongs have previously stored prominence data in association with the page. In other embodiments, the prominence database 104 may be queried for any prominence data associated with the hyperlinks, regardless of any user or group associations to the data. If relevant prominence data exists in the prominence database 104, the prominence data is retrieved and used to determine one or more parameters that can be used to denote the prominence of hyperlinks displayed to the user (described below in regard to blocks 218 and 222). The database may be queried for the prominence data of each hyperlink separately or, alternatively, one query may be used to retrieve the prominence data of all hyperlinks in the page.

At decision block 210, based on the data received from the prominence database 104, the method 200 determines if there are hyperlinks on the page for which prominence data is not found in the prominence database 104. This may occur, for example, if a hyperlink was recently added to the page, and no prominence data for the hyperlink has yet been stored in the prominence database 104. If prominence data for a hyperlink is not found in the prominence database 104, the method 200 may initialize a set of prominence data for each new hyperlink in block 216. In one embodiment, the count of page views (FIG. 5, 712) of the page and the count of click-throughs (FIG. 5, 714) for the new hyperlinks may be initialized to zero. In another embodiment, the count of page views may be initialized to the number of times the current user or all users within the user's group have viewed the page. In yet other embodiments, the count of page views may be initialized to the number of times the page has been viewed by all users. Other data associated with the new hyperlinks, such as one or more prominence scores (FIGS. 5-720, 722 and 724), may also be initialized to zero.

At block 217, the method 200 may identify and delete from the prominence database 104 any hyperlinks that no longer appear on the page. As will be appreciated by those skilled in the art, certain hyperlinks, such as customized web views, targeted content, banner advertisements, etc., may appear intermittently on a page. Therefore, embodiments of the invention may be implemented with criteria that determines the manner in which hyperlinks are added to or deleted from the prominence database 104. For example, in one embodiment, a hyperlink may be deleted from the prominence database 104 if the hyperlink does not appear on the page for a certain amount of time, e.g., a hyperlink may be deleted if it does not appear on the page for two or more days. In other embodiments, a hyperlink may be deleted if it does not appear on the page after a certain number of page views. For example, an implementation of this embodiment may, for example, delete any hyperlinks that do not appear in twenty page views.

At decision block 218, one or more scores (FIGS. 5-720, 722, and 724) are calculated from the recently-retrieved or recently-initialized prominence data and used to determine one or more parameters affecting a display of a corresponding hyperlink. Hyperlinks that had their prominence data initialized in block 216 may include an initialized score that corresponds to a certain display parameter and may not need their scores to be calculated. In one embodiment of the invention, an initial score may be used to determine a display parameter until the hyperlink has been on the page for a certain number of page views (ten, for example). This may limit the prospect of providing misleading prominence characteristics that may occur due to a small sample of page views from which to determine the score, and hence the display parameter. The display parameter determined from the initialized score, when used to denote hyperlink prominence, may be set up to let the user know that little or no prominence data for the hyperlink is available.

The score calculation process may be executed on any available system, including the client system 112 and the prominence server 102, it may be triggered each time any prominence data is updated on the prominence server. This would ensure that any score stored in the prominence database 104 corresponds with the other data associated with the hyperlink. It will be appreciated that how or when the scores are calculated or where the score-calculation process is performed is not limited by the sample implementations described herein. The display parameter determined according to a hyperlink's score may, in one embodiment, be an HTML or XML parameter that affects how a Web browser displays the hyperlink. In other embodiments, the display parameter may be a different form of variable interpreted by a program operating on the client system 112. The invention is not limited by the type of parameter used to denote hyperlink prominence.

The one or more scores (FIGS. 5-720, 722, and 724) for a hyperlink may be calculated or determined in any of a variety of ways. In one embodiment, for example, a first score (FIG. 5, 720) is calculated by dividing the count of click-throughs for a hyperlink (FIG. 5, 714) by the count of page views (FIG. 5, 712) of the page on which the hyperlink is found. In this embodiment, the more often a user or group of users click on a hyperlink when a page containing the hyperlink is viewed (resulting in a higher ratio of click-throughs and page views), the more prominently the hyperlink is displayed to the user.

Figure 5:
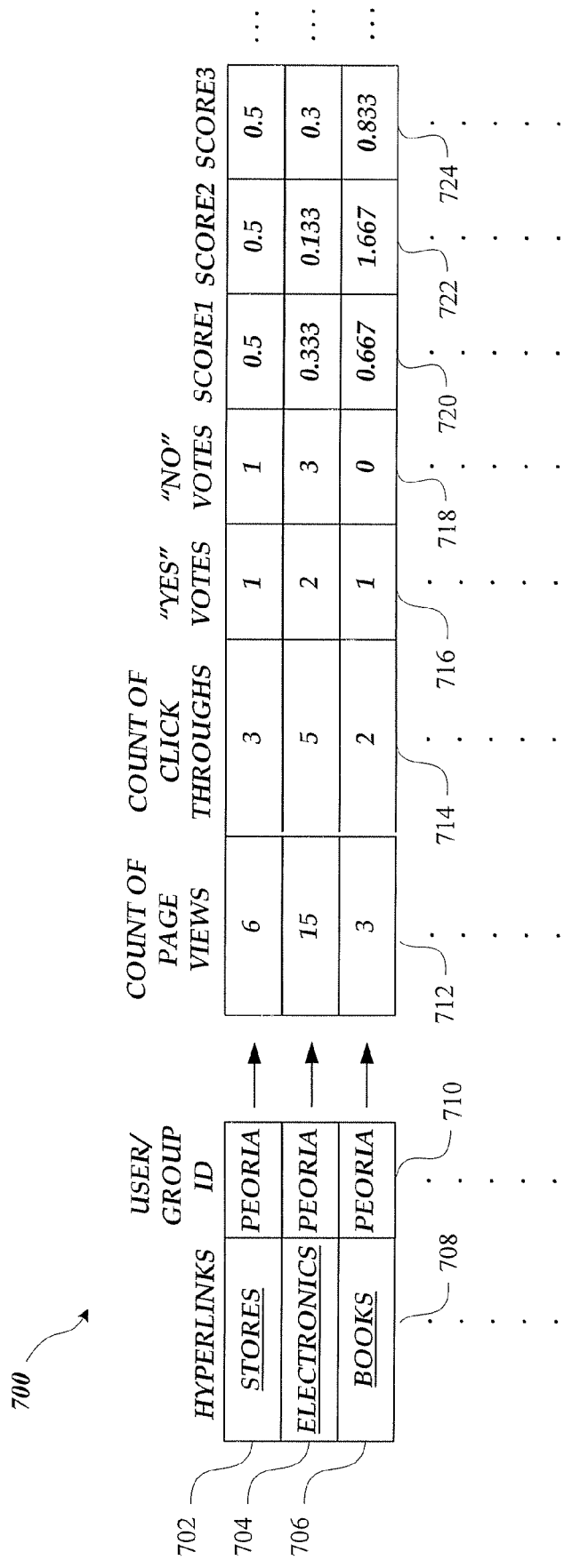
FIG. 5 is a block diagram illustrating an exemplary data structure that may be used to store data in the prominence database depicted in FIG. 1.

In some embodiments, the calculation for the score may incorporate feedback received from one or more users. For example, users can provide feedback about a hyperlink by indicating whether the target of the hyperlink was found to be useful. If the hyperlink target (e.g., linked Web page content) was valuable or helpful to the user, the user may cast a "YES" vote for the hyperlink (FIG. 5, 716), whereas if the target content was not valuable or helpful to the user, the user may cast a "NO" vote against the hyperlink (FIG. 5, 718). This feedback can be incorporated into the score, for example, by deriving a value from the feedback (such as calculating a weighted difference between the number of "YES" votes and the number of "NO" votes) and multiplying the ratio of the click-throughs to page views for the hyperlink by the derived value.

If the number of click-throughs in this example is represented by the variable "C", the number of page views is represented by the variable "PV", the "YES" votes are represented by the variable "Y", the "NO" votes are represented by the variable "N", and the weighting factor of the vote difference is "X", a formula for this embodiment of the score calculation may be: $[C+X(Y-N)]/PV$. Other embodiments of the score calculation may incorporate user-provided feedback in other ways. The invention is not limited by the methods used to calculate the score or derive a value from the feedback. For example, if users provide feedback in the form of a percentage representing helpfulness of the linked content, and the percentages are aggregated and averaged across a group of users, a hyperlink found to have an average helpfulness percentage of 80% may appear twice as prominent as a hyperlink that was only found to have an average helpfulness of 40%. Other embodiments of the score calculation process may incorporate the count of page views and the count of click-throughs, or other information concerning user interaction with hyperlinks in a page, in other ways. Multiple scores may be calculated, and if desired, stored as shown in FIG. 5.

At block 220, updated prominence data is stored in the prominence database 104. This updated data may include updated scores as well as updates for other information concerning user interaction with hyperlinks in a page. In some instances, the updated prominence data may include new hyperlinks and new user information that may be due to a user visiting the page for the first time or due to hyperlinks having been recently added to the page. The method 200 terminates after the page and display parameters corresponding to hyperlinks on the page have been provided to the user at block 222.

After the page and display parameters are provided to the user in block 222, the method 300 of FIG. 3 begins operation. The method 300 begins at block 302, wherein the page is displayed to the user using the display parameters to denote the prominence of the displayed hyperlinks. As will be depicted and described hereafter, the prominence of a hyperlink may be denoted through the hyperlink's font, size, color (e.g., hue, saturation, intensity), brightness, progression or motion, or other parameter. Alternatively, symbols or numbers, such as the number of click-throughs or score associated with the hyperlink, may be shown to denote the hyperlink's prominence. Other characteristics can be used to denote prominence as well. The invention is not limited by the characteristic(s) used to denote prominence.

After the page is displayed to the user in block 302, the count of page views for the page may be incremented and stored in the prominence database 104, as indicated at block 318. In other embodiments, the count of page views may be incremented before the page is displayed to the user. Additionally, in other embodiments, page view count information may be stored on the client system 112 for some period of time before the count of page views is transmitted to the prominence server 102. If desired, one or more scores may be calculated and stored in the prominence database 104 after the count of page views is incremented.

In any event, the method 300 next determines at decision block 304 whether any hyperlinks on the page have been clicked. If no hyperlinks have been clicked, the method then checks at decision block 308 whether the page is still being displayed to the user. A page may cease being displayed if, for example in the case of displaying a Web page, the user navigates to a new Web page having a different network address (URL). In that circumstance, the prior Web page is no longer displayed and is replaced by the new Web page. In other circumstances, the user may close, terminate, or otherwise disable the application (e.g., Web browser) used to display the page.

If the page is no longer being displayed, the method terminates at block 316. Otherwise, if the page is still being displayed, the method loops back to decision block 304 and again checks to see if any hyperlinks on the page have been clicked. As long as no hyperlinks have been clicked and the page continues to be displayed, the method may continue to traverse the loop between decision blocks 304 and 308. The method 300 may determine that a hyperlink has been clicked, for example, when the prominence server 102 receives a request for prominence data for a page at a new network address (e.g., as described at block 202 in FIG. 2).

Returning to decision block 304, in the case where a hyperlink on the page has been clicked, the count of click-throughs for the associated hyperlink is incremented at block 306 and stored in the prominence database 104. In one embodiment, the incremented count may be held on the client system 112 for a period of time before it is sent to the prominence database 104. In other embodiments, the count of click-throughs is not sent by the client system 112, but instead the client system 112 sends information identifying the clicked hyperlink, along with an individual or group identification of the user that clicked the link, to the prominence server 102, and a process running on the prominence server 102 increments and stores the count of click-throughs in the prominence database 104.

After the count of click-throughs has been incremented at block 306, the method determines at decision block 310 whether feedback is being collected from the user. If feedback is not being collected, the method 300 terminates at block 316. In the exemplary embodiment shown, if feedback is being collected, the system provides a feedback interface to the user in block 312 and stores the collected feedback in block 314.

In one embodiment, the feedback interface may be implemented as a voting system. For example, the system may query the user to determine whether the user was helped by clicking the hyperlink. If the user was helped, the user may vote "YES" and the corresponding count of "YES" votes (FIG. 5, 716) in the prominence database 104 would be incremented. If the user did not find that clicking the hyperlink was helpful, the user may vote "NO" and the corresponding count of "NO votes (FIG. 5, 718) in the prominence database 104 may be incremented. In some cases, a user may choose not to vote on the hyperlink. In that case, neither vote count may be incremented, or one of the vote counts may be incremented as a default. It will be appreciated that the invention is not limited by the type or form of feedback collected.

User feedback may be stored in the prominence database 104 immediately after it is submitted, or it may in other embodiments be held on the client system 112 for some period before being stored in the prominence database 104. Furthermore, as will be depicted and described hereafter, the prominence data, including the count of page views, the count of click-throughs, the "YES"-vote tally, the "NO"-vote tally, and the score may, in some embodiments, not only be associated with a hyperlink, but additionally associated with a user or a group of users.

Of course, implementations of the invention are not limited to the methods shown in FIGS. 2 and 3. Other methods may include additional actions or eliminate some of the actions shown. For example, as noted above, embodiments of the invention that use the full network address of the page for storing prominence data instead of a portion thereof may eliminate the analysis performed in block 206. Additionally as discussed above, block 204 may be skipped if the prominence database 104 is updated each time a new hyperlink is added to a page. Block 204 may also be skipped if prominence data for a hyperlink is only added to the database after the hyperlink has been clicked in decision block 304. In such an embodiment, hyperlinks not found in the database 104 at block 208 may be displayed with an "initial" display parameter in block 302. In other embodiments, a score associated with a hyperlink may be calculated each time prominence data associated with the hyperlink is updated. In that case, the score may be calculated at other points in the method 200 or method 300 than at block 218.

A feedback interface may automatically be available to a user and feedback automatically stored while the feedback is being received from the user. In such case, blocks 312 and 314 may be combined into one block. In yet other embodiments, user feedback may be stored according to a predetermined schedule, such as every 5 seconds (for example), especially when new feedback is being entered, with perhaps a final automatic storage occurring when the feedback interface is no longer provided.

The actions shown in FIGS. 2 and 3 may also be performed in a different order than shown. For example, the address analysis in block 206 may occur before the page is retrieved in block 204. Additionally, determining the display parameter in block 218 may occur after updated prominence data is stored in block 220. Further, incrementing the count of page views as discussed in block 318 may occur before or after the page is displayed in block 302. The methods depicted in FIGS. 2 and 3 provide just one example of an implementation of the invention.

Figure 4A:
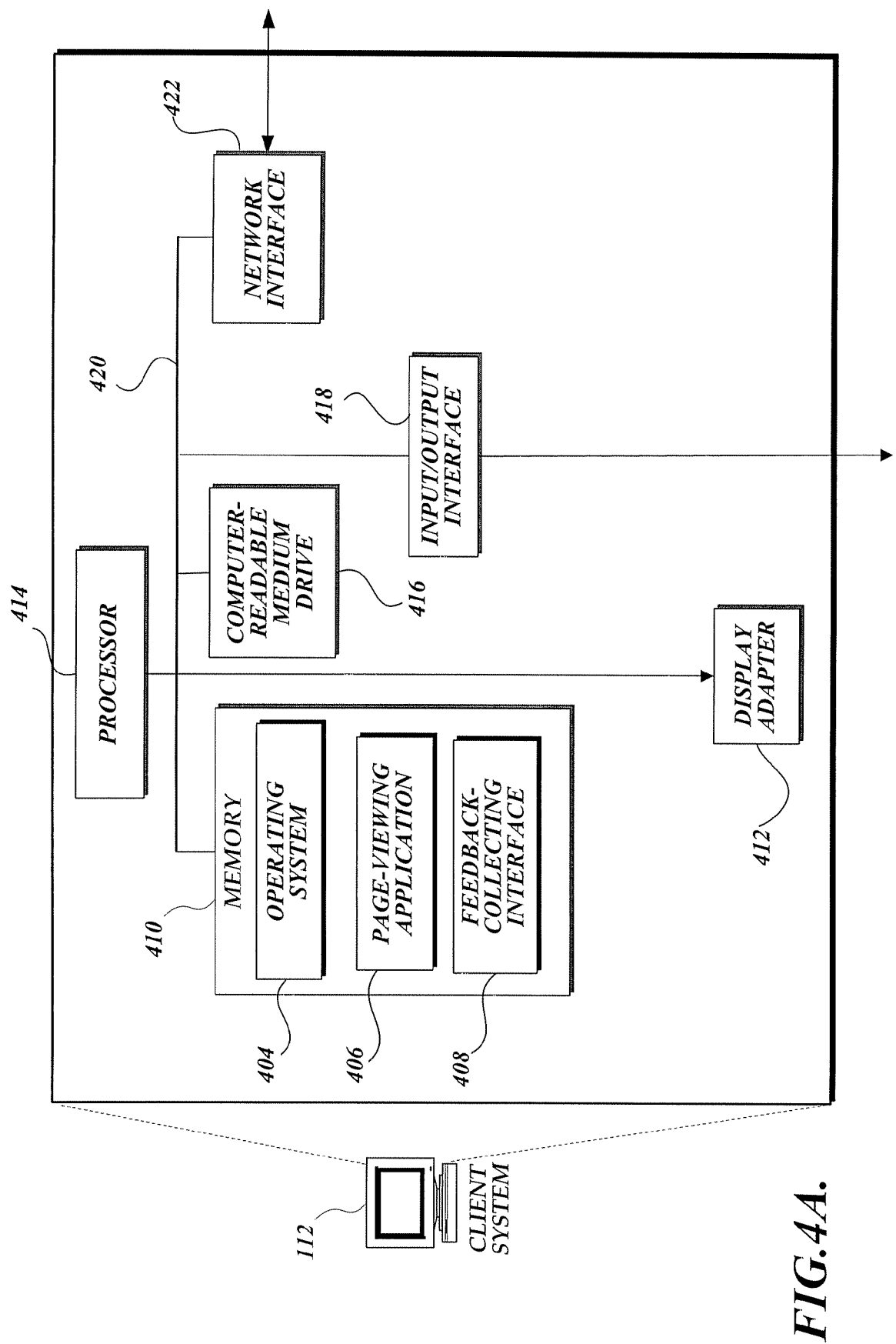
FIG. 4A is a block diagram showing exemplary components that may be incorporated in a client system as depicted in FIG. 1.
Figure 4B:
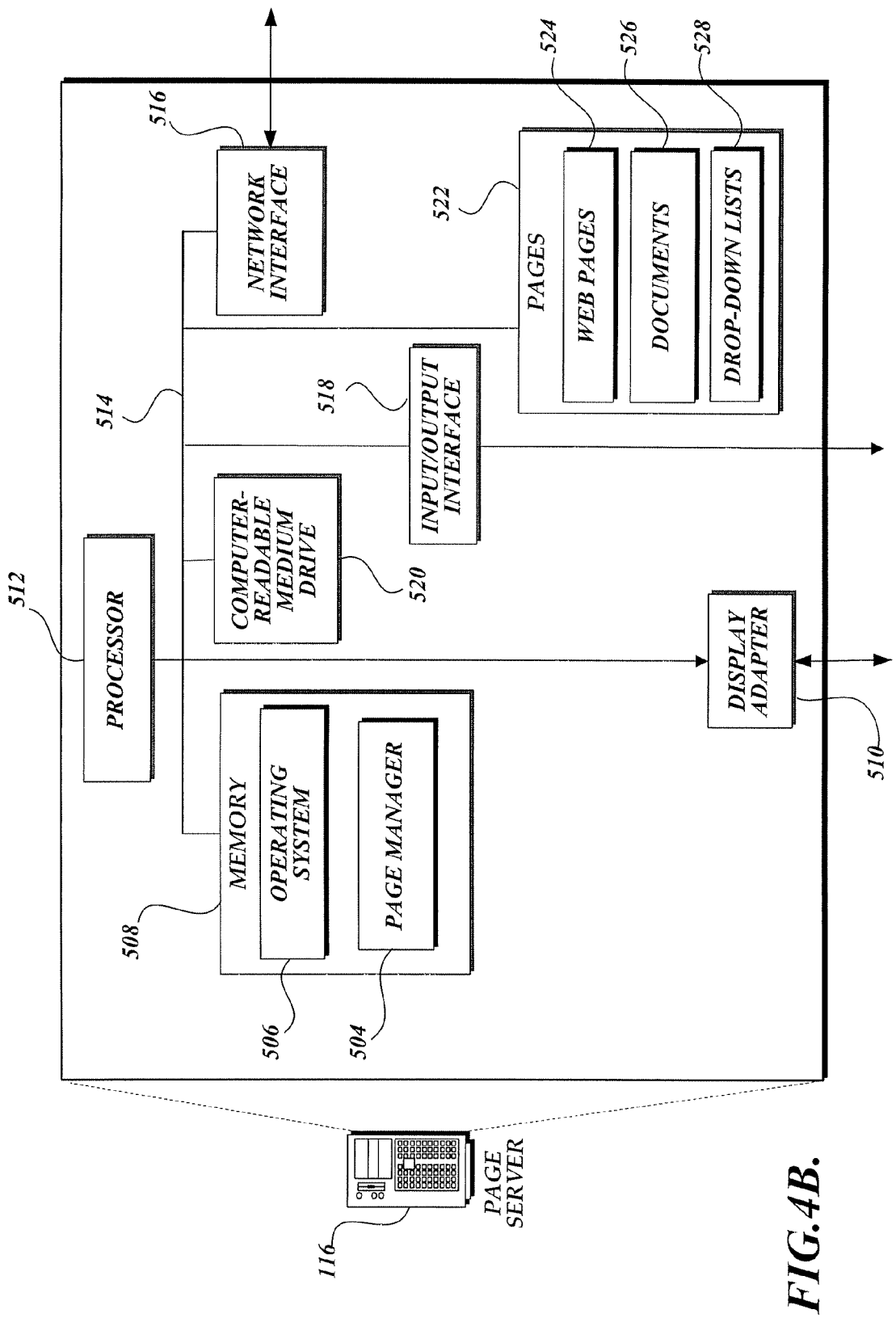
FIG. 4B is a block diagram showing exemplary components that may be incorporated in a page server as depicted in FIG. 1.
Figure 4C:
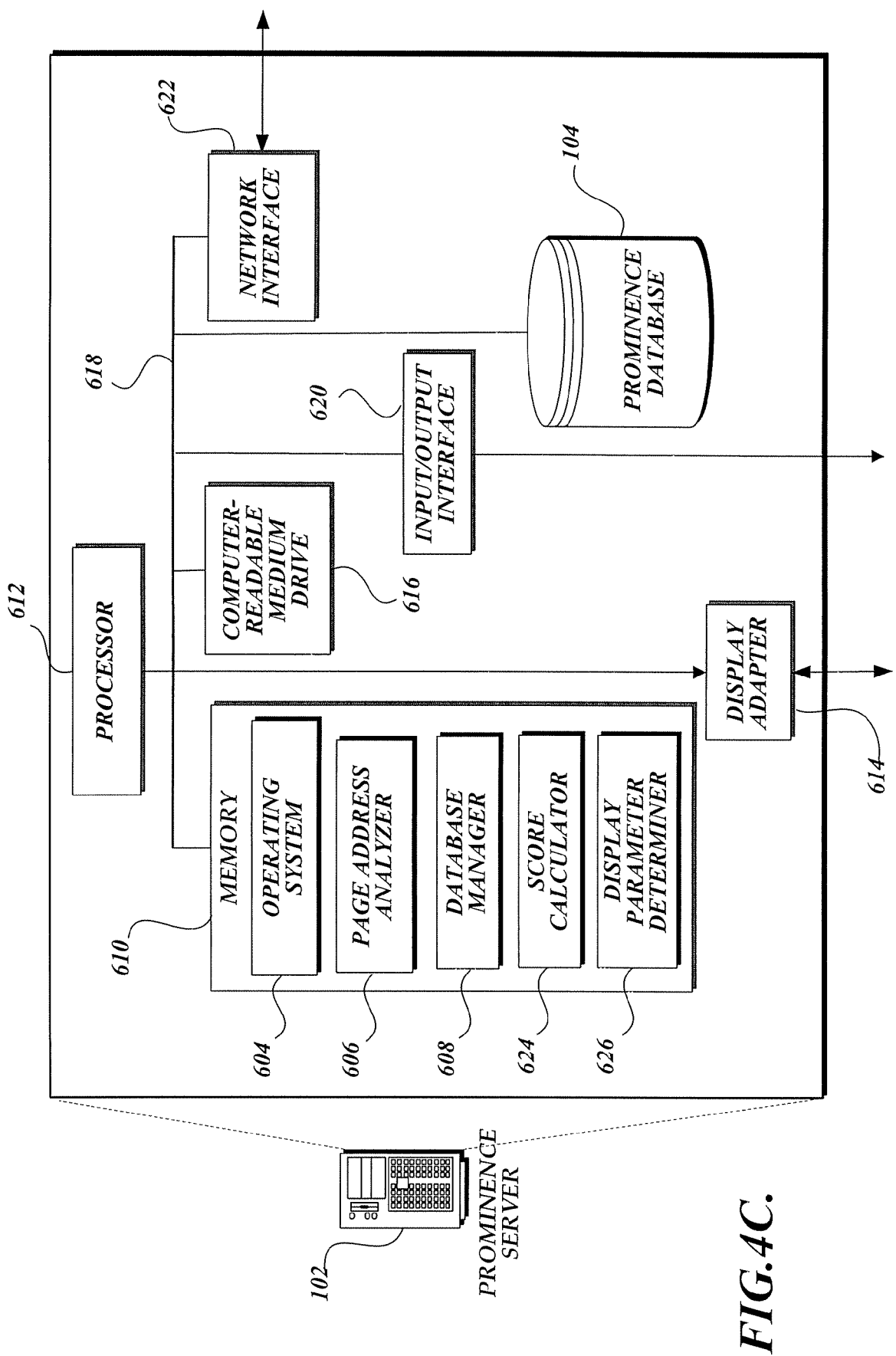
FIG. 4C is a block diagram showing exemplary components that may be incorporated in a prominence server as depicted in FIG. 1.

Turning now to FIGS. 4A-4C, exemplary computer architectures for the page server 116, client system 112, and prominence server 102 shown in FIG. 1 are described. Of course, those skilled in computers will appreciate that the client system 112, as well as the page server 116 and prominence server 102 described below, may include more or fewer components than those shown in FIGS. 4A-4C.

The client system 112 shown in FIG. 4A is connected to the network 106 (FIG. 1) using a network interface 422. The network interface 422 includes the necessary hardware and software to allow the client system 112 to communicate with other computing devices connected to the network 106 using one or more suitable communication protocols, such as TCP/IP.

The client system 112 further includes a processor 414, a memory 410, a video display adapter 412, a computer-readable medium drive 416 (e.g., disk drive), and an input/output interface 418, all communicatively connected together and to the network interface 422 by a communication bus 420. The memory 410 generally comprises RAM, ROM, and/or permanent memory. The memory 410 stores an operating system 404 for controlling the general operation of the client system 112. The operating system 404 may be a general-purpose operating system such as a Microsoft® operating system, UNIX®, or Linux® operating system.

The memory 410 additionally stores program code and data for providing a page-viewing application 406 that allows users to request and receive pages via the network interface 422. One possible embodiment of a page-viewing application 406 is a Web browser software package that, when executed by the processor 414, displays configurable markup documents, such as the sample Web pages shown in FIG. 6 through FIG. 8. The page-viewing application 406, however, is not limited to Web browsers, and may be any application that can access and display a page.

Also stored in the memory 410 is a feedback interface 408. The feedback interface 408 comprises computer-executable instructions that, when executed by the processor 414, provide a tool for the user to input feedback. Examples of a feedback interface 408 in the form of a toolbar are depicted and described hereafter, though the feedback interface 408 is not limited to a toolbar implementation. The feedback interface 408 may be provided by a separate application executing on the client system 112, or it may be provided by a software process hosted by the prominence server 102 or other computing device, or some combination thereof. The feedback interface 408 in this example may communicate with the prominence server 102 (FIG. 4C) via the network interface 422.

The video display adapter 412 provides display signals to a local display permitting a user 108 to observe and interact with the client system 112. The input/output interface 418 likewise communicates with external devices not shown in FIG. 2, such as a mouse, keyboard, scanner, pen, or other input device that can be operated by the user 108.

FIG. 4B depicts an exemplary computer architecture for a page server, such as the page server 116 shown in FIG. 1. A page server 116 is not necessary to practice the invention, but may operate in connection with a client system 112 to deliver one or more requested pages to a user. There may be many, many page servers communicating with client systems via the network 106. The page server 116 may be operated by the same entity that operates the prominence server 102 (depicted in FIG. 4C) or may be operated by an unrelated third party.

The functions of the page server 116 and the prominence server 102 may even be provided by the same computing system.

The page server 116 shown in FIG. 4B includes many components that may operate in a similar manner to those components of similar name described above in FIG. 4A. The page server 116 may include a processor 512 in communication with a memory 508, a display adapter 510, a computer-readable medium drive 520, an input/output interface 518, and a network interface 516, all communicatively connected by a bus 514. The memory 508, as shown, stores an operating system 506 that controls the general operation of the page server 116.

The memory 508 additionally stores program code and data for providing a page manager 504 that interacts with one or more pages 522. As depicted in FIG. 4B, the pages 522 may include such items as Web pages 524, documents 526, computer files 528, etc. In response to receiving a request for a page, the page manager 504 directs one or more of the pages 522 to be delivered to the user (e.g., via the network interface 516).

FIG. 4C depicts an exemplary computer architecture for a prominence server, such as the prominence server 102 shown in FIG. 1. As with the client system 112 and page server 116, the prominence server 102 has a network interface 622 that includes the necessary hardware and software to allow the prominence server 102 to communicate with other computing devices connected to the network 106. Furthermore, the prominence server 102 comprises a computing device that includes several components that may operate in a like manner as described above, including a processor 612, a memory 610, a display adapter 614, a computer-readable medium drive 616 and an input/output interface 620, all communicatively connected to each other and to the network interface 622 by a communication bus 618.

The memory 610 includes an operating system 604 that, when executed by the processor 612, controls the general operation of the prominence server 102. Further included in the memory 610 is program code that, when executed by the processor 612, provides a page address analyzer 606, a database manager 608, a score calculator 624, and a display parameter determiner 626.

When the network address of a page requested by a user is received by the prominence server 102, the page address analyzer 606 analyzes the network address to identify a portion of the address that serves to identify the page, as described earlier in block 206 of FIG. 2. The page address analyzer 606 communicates the uniquely-identifying portion of the address to the database manager 608, which uses the address to query the prominence database 104 and determine whether previously-stored prominence data is available for the hyperlinks found on the page. The prominence database 104 may be physically housed within the prominence server 102 as shown in FIG. 4C, or may be located separate from the prominence server 102, as shown in FIG. 1. When separately located, the prominence database 104 may communicate with the prominence server 102 by a direct communication link as depicted in FIG. 1, or by network communication.

As will be depicted and described hereafter, the prominence database 104 may be comprised of a large capacity storage device that contains data structures adapted for storing prominence data in association with a user or group identity and hyperlinks contained on a page. The data structures in the prominence database 104 may be organized in any suitable fashion, including in the form of a table.

If the database manager 608 determines from the prominence database 104 that previously-stored prominence data is available for the hyperlinks on the page, the database manager 608 retrieves the prominence data from the database 104 and communicates it to the display parameter determiner 626 that determines the display parameter(s) used to denote the prominence of the hyperlinks on the page when they are displayed. Alternatively, prominence data may be communicated directly to the client system 112 which determines the display parameter(s) and displays the hyperlinks at varying prominence to the user. It should be understood that a display parameter as that term is used herein can be any type of parameter that can affect the display of a hyperlink.

The score calculator 624 is comprised of program instructions that, when executed by the processor 612, perform the score calculations described above in regard to block 218 of FIG. 2. Alternatively, the score calculations may be performed at the client system 112.

FIG. 5 depicts an exemplary data structure that may be used to store prominence data in the prominence database 104. In this example, the data structure takes the form of a table that includes prominence data for the hyperlinks contained on the sample page located at the network address "http://www.x-webdomain.com." In other embodiments, the data structure may take other forms, such as a linked list or an array of linked lists. Additionally, in other embodiments, the data structure may contain data for a page identified by an address that corresponds to an Internet Protocol (IP) address, a program command (e.g., for a drop-down list), FTP command, an address on a local computer (such as a drive identifier and file name), URI, URL, etc. The prominence database 104 may store many tables, with each table corresponding to a different page.

In the exemplary embodiment of FIG. 5, the table comprises three rows 702, 704, and 706, each comprised of prominence data associated with a hyperlink 708 and a user or group identity (ID) 710. In some embodiments, the user/group ID column 710 may not be necessary, particularly when the prominence data associated with a hyperlink includes prominence data associated with all users having access to the page.

In the exemplary embodiment shown, prominence data associated with a hyperlink may be limited to a user or group of users. For example, the row comprising data for the "STORES" hyperlink 702 is limited to that data associated with the "PEORIA" user/group ID 710. Although not shown in FIG. 5, another row representing data associated with the "STORES" hyperlink may be inserted into the table with a different user or group ID, such as "PARIS" for example. The data contained in that row would be specific to the user or group "PARIS." Additionally, the user/group ID column 710 may be used to group users according to their scope. For example, all users accessing the page through an intranetwork may be included in one group while all users accessing the page through an Internetwork may be included in another group.

The prominence database 104 may use the hyperlinks column 708 and user/group ID column 710 to identify and retrieve some or all of the prominence data stored in columns 712 through 724. In other embodiments, additional or different columns of identifying information may be used by the prominence database 104 to store the prominence data. It will be appreciated that the invention is not limited by the number of rows or columns or other formatting of the table illustrated in FIG. 5.

In the exemplary embodiment of FIG. 5, columns 712-724 include prominence data representing a count of page views 712, a count of click-throughs 714, a count of "YES" votes 716, a count of "NO" votes 718, a first score "SCORE1" 720, a second score "SCORE2" 722, and a third score "SCORE3" 724. In other embodiments, prominence data may be represented by more or fewer data columns.

The count of page views column 712 may be used in one embodiment to store the total number of times the page has been viewed. In other embodiments, the COUNT OF PAGE VIEWS column 712 may store the number of times the page has been viewed while each respective hyperlink has been included on the page. Additional embodiments may have the count of page views column 712 store the number of times the page has been viewed since each respective hyperlink was first clicked. In yet other embodiments, the count of page views column 712 may store the number of page views that occurred after the respective hyperlink was added to the page minus a predetermined number, such as ten for example. It will be appreciated that the invention is not limited by how page views are counted and stored.

The count of click-throughs column 714 may be used to store the number of times each respective hyperlink has been clicked through when the page has been viewed. The count may start when the hyperlink is first clicked through or may start after a certain number of clicks. In some embodiments, the user may be viewing pages and clicking hyperlinks in the context of a user session. In that case, page views or click-throughs that occur more than once in the same user session may not be counted more than once. A user session may expire or otherwise terminate after a set amount of time, when the program used to view the page is terminated, when the user leaves the domain of the Web site, etc. It will be appreciated that the invention is not limited by how click-throughs are counted.

In the exemplary embodiment shown in FIG. 5, feedback regarding a hyperlink is received from users in the form of "YES" votes and "NO" votes. The count of these votes is stored in columns 716 and 718. In other embodiments, feedback may be provided in other formats. For example, users may rate the hyperlinks, using a number from 1 to 10, or they may provide a percentage value that indicates how useful the hyperlink was to them. As will be depicted and described herein, feedback may be collected from a user through a feedback-interface.

In FIG. 5, scores for each hyperlink are calculated and stored in column 720, column 722, and column 724. The scores associated with a hyperlink may be calculated in many ways, examples of which are described in detail above in reference to block 218 of FIG. 2.

The table 700 contains prominence data for hyperlinks found in a page identified by the address "http://www.xwebdomain.com." Row 702 of table 700 stores data for the STORES hyperlink and the user/group identity PEORIA. For purposes of this example, PEORIA will be assumed to be a group ID, but in other embodiments, PEORIA may represent a single user. Associated with the STORES hyperlink and the PEORIA group is a count of page views of the page "http://www.xwebdomain.com." stored in column 712 which in this example is 6. Similarly, the count of page views in row 704 associated with the ELECTRONICS hyperlink and the PEORIA group is 15. The count of page views in row 706 associated with the BOOKS hyperlink and the PEORIA group is 3.

In some embodiments, each count of page views in a table may be equal. This may occur, for example, if the count of page views for each hyperlink began at the same time, e.g., when the page was first created, and no new links have been added to the page. In the exemplary embodiment of FIG. 5, each count of page views is different, which may occur, for example, if the hyperlinks were added to the page at different times and the count of page views began when each respective link was added to the page. Although the exemplary embodiment depicts PEORIA as the user/group ID for all the rows in the table, any user/group ID may be stored in the table and each hyperlink on the page may be associated with more than one user/group ID. For example, the STORES hyperlink may be stored in another row in association with a different user/group ID.

As previously noted, the count of click-throughs for each hyperlink on a page is stored in column 714. In the example shown in FIG. 5, the STORES hyperlink was clicked on 2 times by members of the PEORIA group, the ELECTRONICS hyperlink was clicked on 5 times by members of the PEORIA group, and the BOOKS hyperlink was clicked on 1 time by members of the PEORIA group. If desired, page views or click-throughs that occur more than once in the same user session may be counted once only.

Once a hyperlink has been clicked through, users may leave feedback regarding the hyperlink they clicked through. In the exemplary embodiment of FIG. 5, this feedback comes in the form of YES and NO votes, with the count of these votes being stored in columns 716 and 718. As depicted in FIG. 5, the STORES hyperlink received one YES vote and one NO vote by members of the PEORIA group, the ELECTRONICS hyperlink received 2 YES votes and 3 NO votes by members of the PEORIA group, and the BOOKS hyperlink received 1 YES vote and 0 NO votes by members of the PEORIA group.

As noted previously, one or more scores may be calculated for each hyperlink stored in the prominence database 104. In the example shown in FIG. 5, the first score 720 was calculated using the formula C/PV, where the variable "C" represents the number of click-throughs 714 and the variable "PV" represents the number of page views 712. Using this formula results in scores of 0.5 for the STORES hyperlink, 0.333 for the ELECTRONICS hyperlink, and 0.667 for the BOOKS hyperlink. The exemplary embodiment of FIG. 5 also depicts a second score 722, which was calculated using the formula [C+X(Y−N)]/PV, described earlier, in which X is set to 3. Using this formula, the STORES hyperlink scored 0.5, the ELECTRONICS hyperlink scored 0.133, and the BOOKS hyperlink scored 1.667. The third score 724 depicted in FIG. 5 was calculated using the formula [C+X(Y−N)]/PV, wherein X is 0.5. By using a value of X equal to 0.5, as opposed to the value of 3 when calculating the second score 722, a lesser weighting may be given to the user-provided feedback 716 and 718. As depicted in FIG. 5, the resultant scores 724 are 0.5 for the STORES hyperlink, 0.3 for the ELECTRONICS hyperlink, and 0.833 for the BOOKS hyperlink. These scores may be used to determine the prominence of the respective hyperlinks when the page with the hyperlinks is displayed.

Calculation and storage of multiple scores may allow for different scores to be used in different situations. For example, the second score 722, which was calculated using a higher value of X, may be used when user feedback is desired to play a larger role in how prominently the hyperlinks are displayed. If user feedback is less important, the third score 724, which was calculated using a smaller value of X than the second score 722, may be used to set the display parameters for the hyperlinks on the page. Calculating and storing multiple scores may also allow for users to choose which score they would like to use to set display parameters for hyperlinks on the pages they view.

Although the exemplary embodiment of FIG. 5 depicts a table for all hyperlinks on the page "http://www.xwebdomain.com," other data structures may be constructed to store data for individual hyperlinks, regardless of the page the hyperlink was on when it was clicked. For example, the STORES hyperlink in row 702 may be on a page having the address "http://www.xwebdomain.com" and on a page having the address "http://www.xwebdomain.com/information." In this particular embodiment, the two STORES hyperlinks can be considered to be the same for purposes of storing and retrieving prominence data. This may be accomplished by analyzing the underlying target computer addresses to which the two hyperlinks point. In this manner, if a hyperlink appears as a graphic on http://www.xwebdomain.com and as text on http://www.xwebdomain.com/info, but the underlying target address is the same, the user activity reported in columns 712, 714, 716, 718 may be aggregated for use of the two hyperlinks across both pages. Embodiments of the invention may also be implemented to take into account information such as traffic (e.g., number of hits) that a Web page receives or has received, either from a particular user, a group of users, or from users in general. This information can help set a basis for determining the level of prominence of links to that page when such links are displayed on referring pages. Similarly, the significance of a page as measured or otherwise determined by an entity or operation, such as a search service, Web crawler service or other service, may be used to affect the prominence of display of links to that page. In yet other embodiments, instead of being associated with a page, a data structure in the prominence database 104 may be associated with the entire Internet, an intranetwork, a user's local computer, or some other scope.

In embodiments of the invention where the user is a member of a group, the count of click-throughs may encompass all click-throughs effected by every member of the group. In another embodiment where the user desires to be individually tracked, the count of click-throughs encompasses only those click-throughs performed by the individual user. Further embodiments may increment the count of click-throughs each time any user clicks on the associated hyperlink. A similar handling of counting page views may be used.

Figure 6:
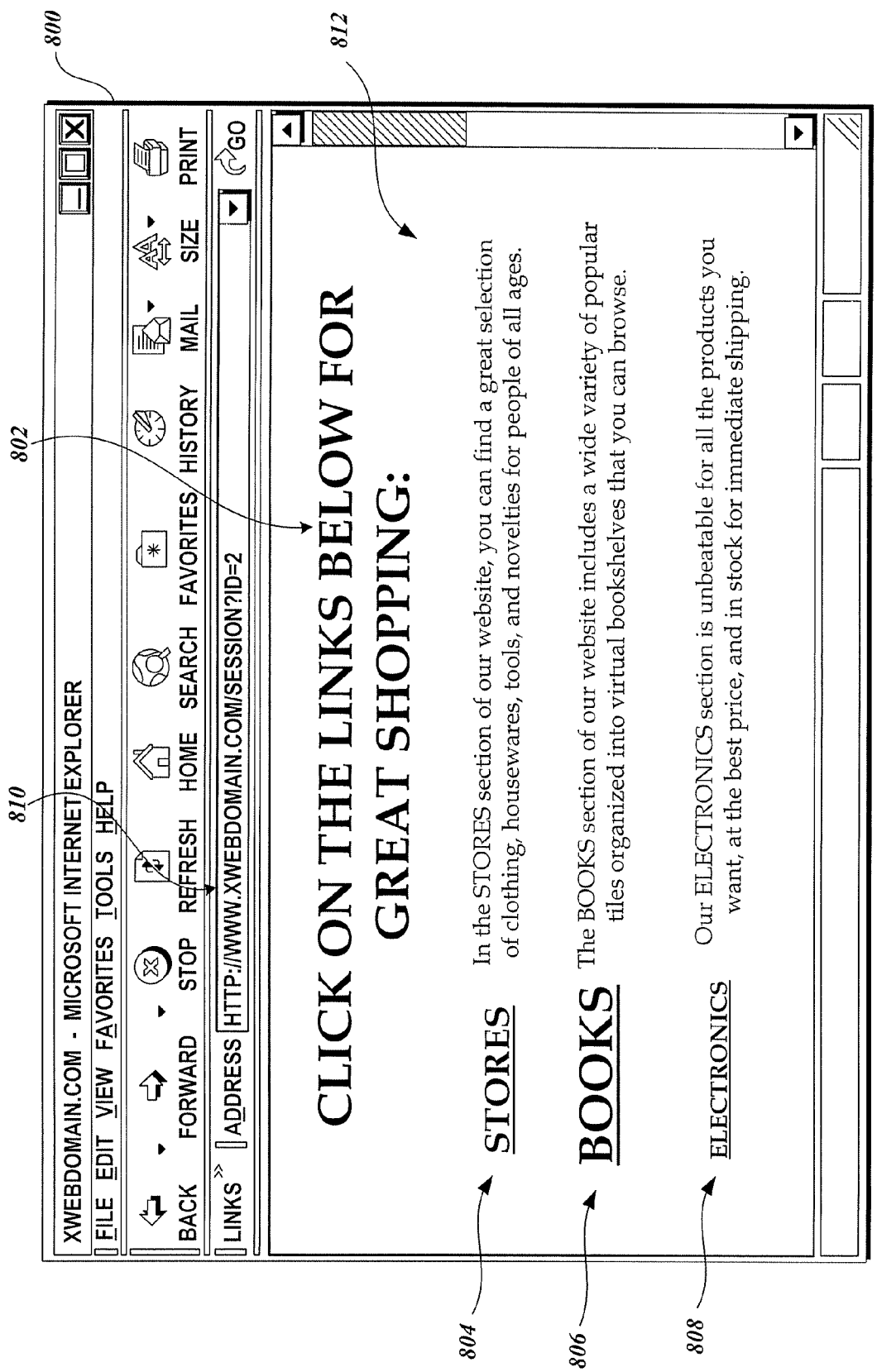
FIG. 6 is a display diagram showing a typical Web browser with a Web page having hyperlinks displayed at various levels of prominence.
Figure 7:
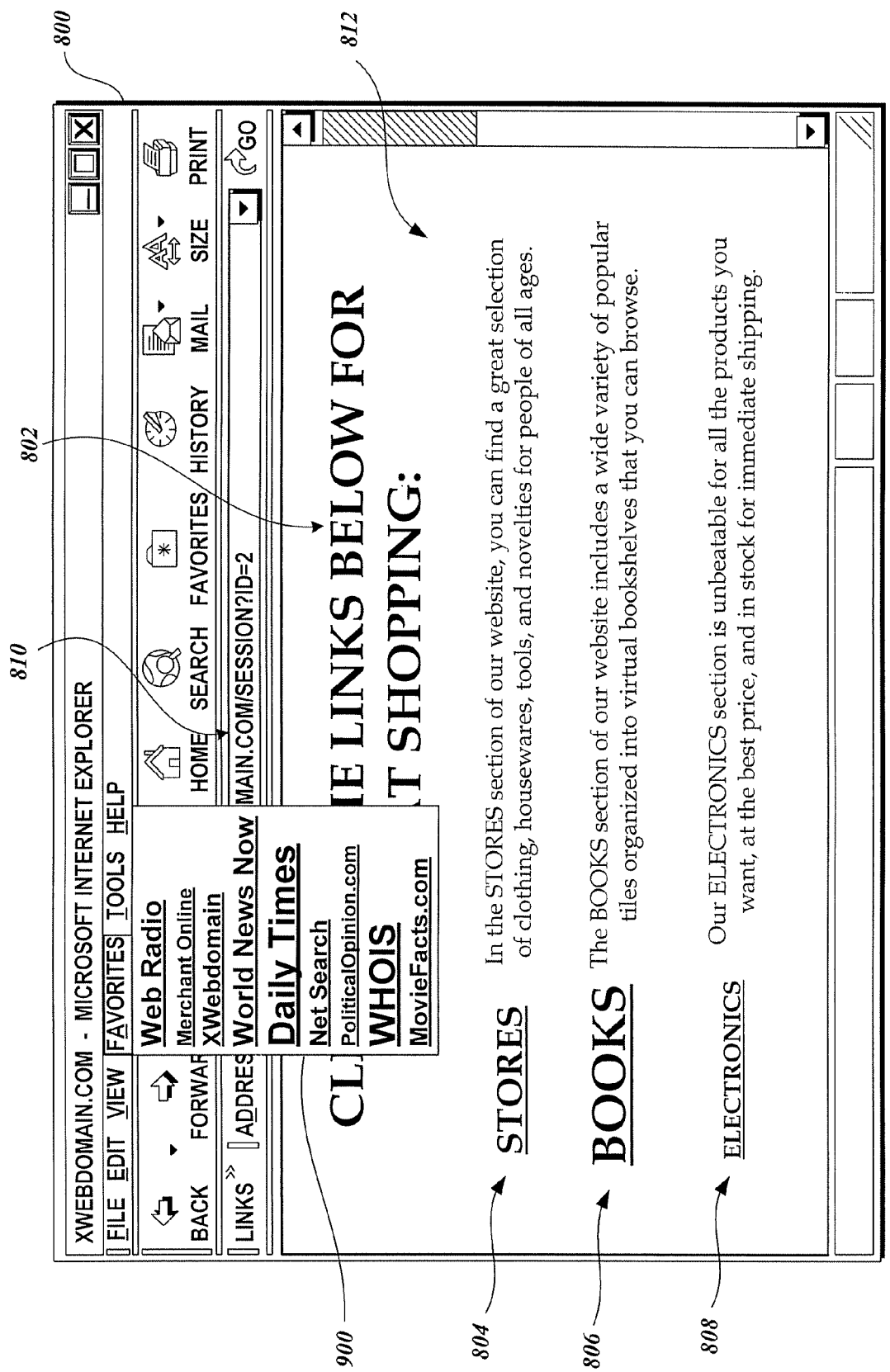
FIG. 7 is a display diagram showing a typical application program with a "favorites" list that has hyperlinks displayed at various levels of prominence.
Figure 8:
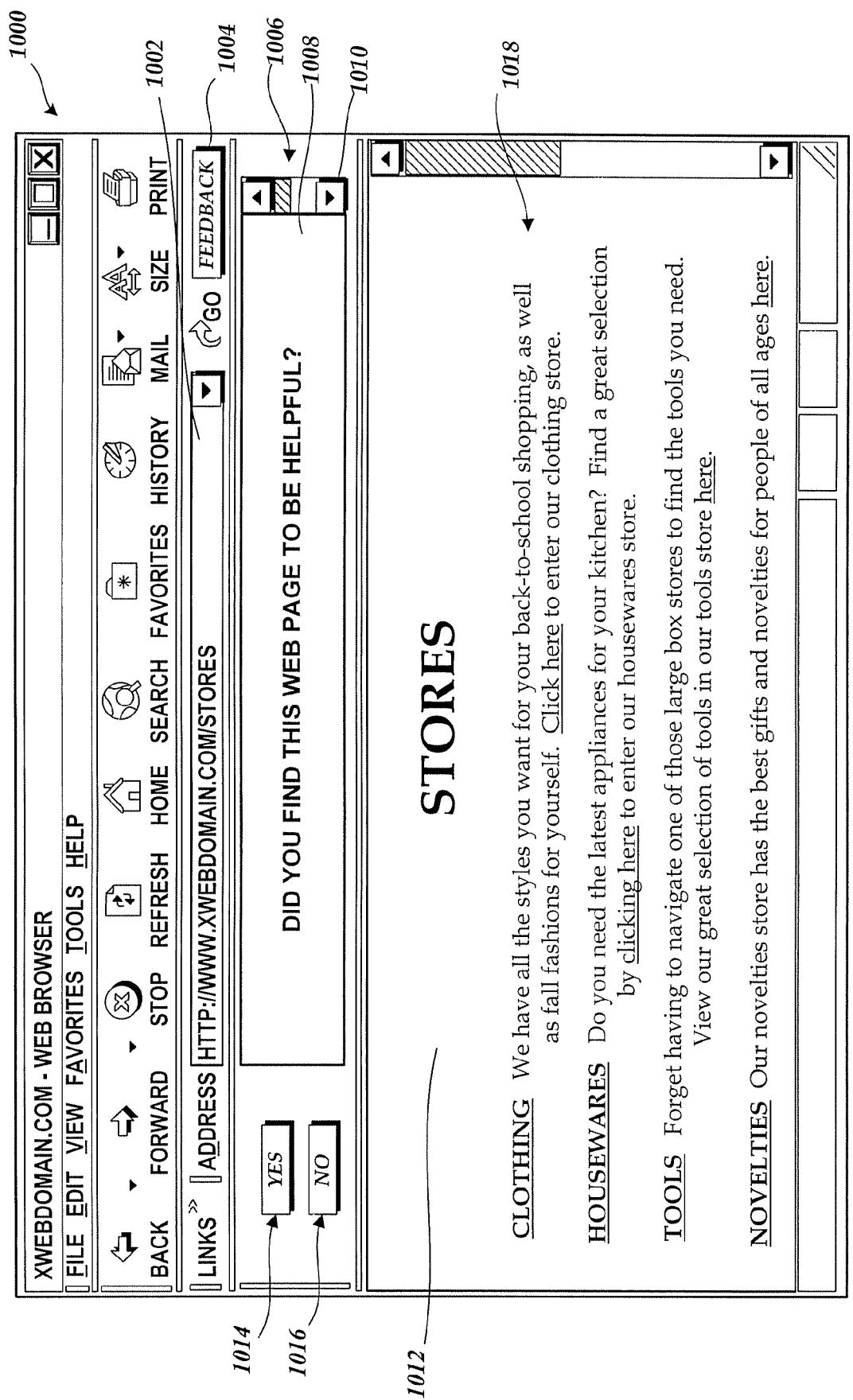
FIG. 8 is a display diagram showing a typical Web browser having a feedback toolbar with voting buttons that allow a user to provide feedback about a clicked hyperlink.

Described next in connection with FIGS. 6-8 is a specific example of a page-viewing application 406 (FIG. 4A) in the form of a Web browser 800. In FIG. 6, the Web browser 800 includes a display area 812 for displaying a page, such as a Web page, a document, a file, etc., that includes various hyperlinks.

In this example, the Web page in the display area 812 is identified by a network address in the form of a URL as shown in the address block 810. When a user enters the URL into the address block 810, the Web browser requests the particular page (here, a page with hyperlinks to various shopping sites) from a server (here, one or more page servers identified by "www.xwebdomain.com").

The Web page 812 includes the title "CLICK ON THE LINKS BELOW FOR GREAT SHOPPING" 802 and three hyperlinks 804, 806, and 808. The hyperlinks 804, 806, 808 correspond to the hyperlinks stored in the exemplary data structure of FIG. 5. In this embodiment, the display parameters were set using the first score 720. As can be seen in FIG. 5, the ELECTRONICS hyperlink has a first score of 0.333, which is the lowest of the three hyperlink scores in column 720. The STORES hyperlink has a first score of 0.5, which is the second-highest of the hyperlink scores in column 720. The BOOKS hyperlink has a first score of 0.667, which is the highest of the three hyperlink scores in column 720.

In the exemplary embodiment of FIG. 6, hyperlink prominence is denoted by font size. The BOOKS hyperlink 806 has the highest score which maps to a display parameter representing a large font size. The STORES hyperlink 804 has the second-highest score which maps to a display parameter representing a medium font size. The ELECTRONICS hyperlink 808 has the lowest score which maps to a display parameter representing a small font size. Different scores may be mapped to different levels of font size for display of the hyperlinks.

Although font size is used in FIG. 6 to denote hyperlink prominence, other characteristics may be used to denote prominence. For example, hyperlink prominence may be denoted through the use of different colors. In another embodiment, the hue or intensity of the displayed hyperlinks may be provided to denote different levels of prominence of the hyperlinks on a page. Alternatively, or in addition, symbols, including numbers (such as the score of the hyperlink or the number of click-throughs), may be displayed near the hyperlink to denote the relative prominence of the hyperlinks on the page. In yet other embodiments, prominence may be denoted by using various levels of brightness. Those skilled in the art will appreciate that the invention is not limited by the display characteristics used to denote hyperlink prominence.

In the exemplary embodiment of FIG. 6, each hyperlink is displayed at a different level of prominence. However, hyperlinks may be displayed at similar levels of prominence depending on their prominence data. For example, the levels of prominence of hyperlinks displayed on a page may be defined by some number of levels, e.g., ten levels. In such an example, hyperlinks may be grouped so that those with scores from 0.0 to 0.1 are correlated in one group having a display parameter for one level of prominence, those with scores from 0.1 to 0.2 are correlated in another group having another display parameter for another level of prominence, those with scores from 0.2 to 0.3 are correlated in yet another group having a display parameter for another level of prominence, and so on (assuming a scoring calculation that has a range of 0.0-1.0). In other embodiments, instead of using a linear grouping, the grouping of hyperlinks may be such that the scores of the hyperlinks fit a curve distribution. For example, there may be four groups dividing the scores from 0.0 to 0.3 and four groups dividing the scores from 0.7 to 1, while only two groups dividing the scores from 0.3 to 0.7. In other embodiments, an exponential distribution may be used to group hyperlinks of various prominence levels.

While one of the foregoing examples suggests ten levels of prominence, it should be well understood and appreciated that other exemplary embodiments may involve any number of levels of prominence. In some circumstances, two, three, or more levels of prominence are appropriate. In other circumstances, at least four levels of prominence, and sometimes more, are advantageous. Moreover, the prominence at which a hyperlink is displayed may be increased or decreased to a different level of prominence depending on the prominence data considered.

In some embodiments, different levels of prominence may be denoted using different temporal display characteristics for the hyperlink. A hyperlink may be displayed, for example, using a progression of images, words, letters, symbols, colors, or other elements that may be shown in a sequence. Such progressive display may, in some circumstances, impart a motion characteristic to the display of the hyperlink. In accordance with principles of the invention, features such as speed, frequency, and/or order of the progression may be adjusted to reflect different levels of prominence for the hyperlink. The images, words, letters, symbols, colors or other elements in the progressive display may also be modified to reflect different levels of prominence.

It should further be noted that a hyperlink may be displayed at different levels of prominence without altering or modifying a position on the page at which the hyperlink appears. A hyperlink may have a position on a page at which it appears, e.g., a position relative to a border of the page or relative to other links on the page. In accordance with principles of the invention, the prominence of display of the hyperlink may be affected while the position of the hyperlink on the page remains the same.

Although the example shown in FIG. 6 only includes hyperlinks in text form, persons skilled in the art will appreciate that hyperlinks may be associated with images, tabs, buttons, and other objects or controls on a page. The present invention may also be used to denote prominence for links in these other forms. For example, the text written on a button may be displayed in different fonts to denote different levels of prominence. Images or text that represent hyperlinks may be displayed at various levels of brightness or may contain other indicia that denote prominence. Tabs may be displayed at different sizes to signify prominence. The invention is not limited by the form in which a hyperlink is displayed or presented.

Although not depicted in FIG. 6, if the current user has not previously viewed the hyperlink, first viewed the hyperlink recently, or has only viewed the hyperlink a few times, the hyperlink may be displayed in a manner such that the user will see that the hyperlink is relatively new to the user. In one exemplary embodiment, the word "NEW" or a symbol may be displayed next to the hyperlink. Similarly, hyperlinks that are relatively new to a group of users may be marked as such when displayed to a user in the group.

FIG. 7 depicts an embodiment in which a page that includes a reference list of hyperlinks is displayed in the form of a drop-down list 900 to which the user can add and delete hyperlinks. In this particular embodiment, the drop-down list 900 represents a "favorites" list. Similarly, the drop-down list may be a "history" list that tracks the pages a user has visited. The methods of signifying prominence discussed above (e.g., using different size fonts as shown in FIG. 7) may be applied when displaying the drop-down list 900 to denote the prominence of the various hyperlinks based on user interaction with the hyperlinks. Typically, a "favorites" list or "history" list is intended only for local use by an individual user and thus is stored on the user's local computer for editing and use in association with an application, for example, a Web browser. In alternative embodiments, the reference list may be stored on a remote computer, such as the page server 116 depicted in FIG. 1. The hyperlinks in the reference drop-down list 900 may be used to define the rows of a data structure as shown in FIG. 5 where prominence data for each of the hyperlinks are stored.

In addition to using feedback, click-through and page view data to calculate a prominence score, data on recency of click-throughs may also be incorporated into the score calculation. The count of click-throughs may be set to "decay" over time. In one embodiment, for example, a date may be associated with each click-through, such that once a certain amount of time passes after the click-through occurred, the click-through "expires" and the count of click-throughs 714 (FIG. 5) in the prominence database is decreased by one. For example, if a hyperlink was clicked through on Sep. 15, 2004, and click-throughs expire after six months, then on Mar. 15, 2005, one click-through associated with the hyperlink will expire, thus decreasing the associated count of click-throughs for the hyperlink by one. The count of click-throughs may be set to decrease according to any type of formula, equation, algorithm or criterion.

In another embodiment, the count of page views and/or the count of click-throughs may be set to zero (or some lower value or values) after a number of page views occurs without any click-throughs of hyperlinks on the page. Accordingly, hyperlinks that may have been displayed at higher levels of prominence based on user interaction long ago but no longer used are reset to a lower value, such as zero.

In yet another embodiment, the prominence level for a hyperlink may be decreased level by level if a certain period of time passes without the hyperlink being clicked. For example, the prominence level of a hyperlink may decrease by one level for every month that passes without the hyperlink being clicked. In still other embodiments, the score associated with a hyperlink may decay over time. This decay may occur in a linear, logarithmic, exponential, or other fashion. For example, the score may decrease by 0.1 if the associated hyperlink is not clicked for one month, 0.2 if the associated hyperlink is not clicked through for two months, 0.4 if the associated hyperlink is not clicked through for three months, and so on until the score is zero.

Additionally, in other embodiments, the score associated with a hyperlink may be calculated based on user activity that occurred within a recent period of time. For example, in one embodiment, all click-throughs and page views may expire after three months, such that the score associated with a hyperlink only reflects user activity that occurred within the past quarter. Factoring in recency of click-throughs may be particularly helpful in the context of displaying a page with an individual user's "favorites" list, because a hyperlink in the favorites list may be clicked through quite often for a period of time, and then rarely clicked through or never clicked through after the hyperlink has outgrown its usefulness.

FIG. 8 illustrates a Web browser 1000 that includes several aspects similar to the Web browser 800 described above. The Web browser 1000 includes a display area 1018 that, in this example, displays a Web page 1012. The Web page 1012 is identified in the network by the URL in the address field 1002. The Web browser 1000 further includes a control 1004 that a user may operate to reveal a feedback interface 1006 having voting buttons 1014 and 1016. A user may click on the voting buttons 1014 and 1016 to provide feedback on the helpfulness of the recently clicked hyperlink. In alternative embodiments, the feedback interface 1006 may appear automatically after a user clicks on a hyperlink. The control 1004 may be a button labeled "FEEDBACK" as shown, or any other form of control, such as a hypertext link, check box, etc.

When the user actuates the control 1004, the feedback interface 1006 is revealed to the user. In one suitable embodiment, the feedback interface 1006 is a toolbar that is incorporated into a Web browser such as an Internet Explorer® browser from Microsoft Corporation. A suitable toolbar may be based, for example, on a "COM" component implementing the interfaces IobjectWithSiteImpl, InputObject, and IdeskBand, and registering the component with the operating system, as described in greater detail by a document entitled "Programming and Reusing the Browser," available from Microsoft Corporation. See also "Reusing Internet Explorer and the WebBrowser Control: An Array of Options," available from Microsoft Corporation.

In some embodiments, controls may be displayed within the context of the Web page that is currently displayed in the browser. In other embodiments, controls may be displayed outside the browser window, such as in a separate window, on the desktop, or in the desktop taskbar. In yet other embodiments, visible controls are not displayed, but the user is permitted to use other forms of computer input, such as typing a key or a key combination, or by speaking a voice command, to activate the control.

The feedback interface 1006 includes an instruction field 1008 that instructs the user providing feedback. Feedback entered into the feedback interface 1006 (e.g., using the voting buttons 1014, 1016 in this example) may be stored in the prominence database 104 in association with the network address 810 of the page from which the user clicked through, the hyperlink 804 the user clicked to arrive at the Web page 1012, and the user or user's group, as previously described.

The display size of the feedback interface 1006 may be fixed at a predetermined size with an instruction field 1008 having a defined number of lines. Alternatively, the display size of the feedback interface 1006 may be dynamic such that the size is adjusted according to the size of instructions in the instruction field 1008. For example, if the instructions fit on one line, the display size of the feedback interface 1006 may be adjusted to show only one line in the instruction field 1008. If the instructions occupy two or three lines, the display size of the feedback interface 1006 may be adjusted accordingly to display two or three lines in the instruction field 1008. A maximum display size of the feedback interface 1006 (e.g., three lines, in this example), may be defined if desired. If the size of the instructions in the instruction field 1008 exceeds the display size of the feedback interface 1006, a scroll bar control 1010 is provided to allow the user to scroll through the instructions.

Figure 9:
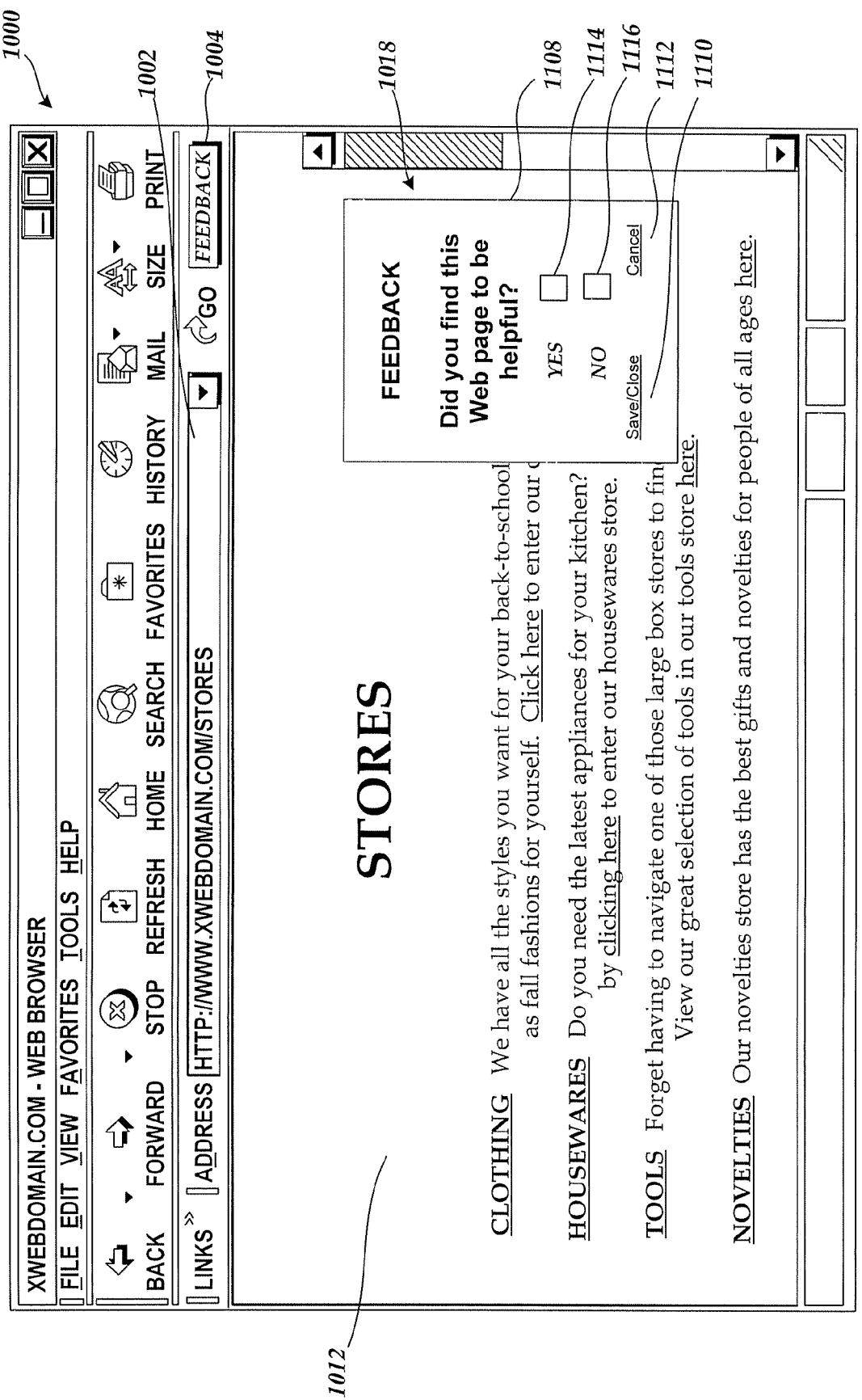
FIG. 9 is a display diagram showing a typical Web browser having a feedback window with check boxes that allow a user to provide feedback about a clicked hyperlink.

FIG. 9 illustrates yet another embodiment in which a Web browser 1000 has a display area 1018 showing a Web page 1012. The network address of the Web page is shown in the address field 1002. The Web browser 1000 includes a control 1004 that, when actuated by the user, opens a feedback interface in the form of a separate window 1108 displayed over the top of the Web page 1012. The feedback interface window 1108 depicted in FIG. 9 includes a rating scale 1114 for providing feedback. In this particular illustration, the rating scale is a slideable bar that the user can move to indicate an answer to the query "Did you find this Web page to be helpful?". The slideable bar can be configured to move at discrete steps or slide continuously on a scale ranging from "YES" to "SOMEWHAT" to "NO".

The feedback interface window 1108 also includes controls 1110 and 1112 in the form of hypertext links labeled "Save/Close" and "Cancel", respectively. Actuation of the control 1110 causes the Web browser 1000 to transmit a command to the prominence server 102 to store in the prominence database 104 the feedback data entered by the user in the feedback interface window 1108. As earlier described, the prominence data may be stored in association with the user, the clicked hyperlink, and the network address of the page on which the clicked hyperlink was found. The control 1110 further closes the feedback interface window 1108, thus enabling the user to continue viewing the Web page 1012. The control 1112, when actuated by the user, causes the feedback interface window 1108 to close without having the feedback data entered by the user stored by the prominence server 102.

As will be appreciated from the foregoing, in some embodiments a feedback interface may be integrated into or otherwise communicate with the user's page-viewing application (e.g., Web browser) to automatically detect when the user is requesting a page with a network address. For example, where a feedback interface is provided in the form of a toolbar or feedback interface to the Internet Explorer® browser from Microsoft Corporation, the browser extension can be configured to recognize when a network address is entered into the browser for purposes of navigating to a page. Such functionality in a browser extension is further described in a document entitled "Web Accessories," available from Microsoft Corporation.

Embodiments of the invention may also be provided in the form of computer-accessible media whose contents direct a computing system to undertake actions as described above. For example, a computer-accessible medium may be inserted into the computer-readable medium drive 616 as shown in FIG. 4C to cause the prominence server 102 to receive a network address for a page on a computer network, receive prominence data in association with clicked hyperlinks, and store the prominence data in association with the network address of the page that includes the clicked hyperlink, without requiring a separate action from the user to store the prominence data. The computer-accessible medium may be further configured with contents directing computing systems to perform other actions described above, such as retrieving prominence data from the prominence database 104.

Several embodiments of the invention have been illustrated and described above. It will be appreciated that various changes can be made to these embodiments without departing from the spirit and scope of the invention. For example, the process of calculating scores based on user interaction with hyperlinks, and using the scores to determine display parameters may be eliminated. Instead, a display parameter for a hyperlink may be determined more directly by correlating the user interaction information to the display parameter for the hyperlink without the intermediate step of calculating a score.

In another exemplary variation, the present invention provides a method for affecting the prominence of display of a hyperlink that involves receiving information concerning user interaction with a first hyperlink, and then determining a display parameter for a second hyperlink based on the information concerning user interaction with the first hyperlink. The display parameter may affect the display of the second hyperlink at any of three or more levels of prominence. In one aspect, the user interaction information may include a count of page views of a page on which the first hyperlink appears and a count of click-throughs of the first hyperlink. In another aspect, the user interaction information may also include feedback provided by the user in regard to the first hyperlink. In circumstances where the first hyperlink is included in multiple pages, the information concerning user interaction may include an aggregated count of page views of the pages on which the first hyperlink appears. Scoring can be used where desired. The method may further comprising calculating a score based on the user interaction information, and using the score to determine the display parameter for the second hyperlink. In yet another aspect, user interaction with the first hyperlink may result in a decrease of prominence of display of the second hyperlink in accordance with the determined display parameter.

Using the foregoing description, persons skilled in the art are able to implement the invention in various environments. In one exemplary environment, a user's client computer obtains the necessary data and provides a display of hyperlinks based on information concerning prior user interaction with the hyperlinks. One example implementation is a client computer configured to request a page from a page server and also request data, such as prominence data, from a prominence server. Using the prominence data, the client computer determines display parameters for hyperlinks in the requested page and displays the page with the hyperlinks in accordance with the display parameters. In some circumstances, e.g., where the client computer possesses a cache of previously-retrieved pages, the client computer may only request prominence data from the prominence server, without issuing a page request to a page server.

In another exemplary environment, a prominence server acts as an intermediary between a user's client computer and a page server that has a page desired by the user. The prominence server receiving the page request from the client computer obtains the desired page from the page server. Prior to delivering the page to the user, the prominence server determines display parameters for hyperlinks in the requested page, modifies the page according to the display parameters, and then delivers the page to the client computer which displays the page to the user.

In yet another exemplary environment, a user's client computer may not directly communicate with a prominence server. A page server may be configured to receive a request for a page from a user's client computer, and before delivering the requested page, the page server obtains prominence data (which may include one or more display parameters) from the prominence server, modifies or prepares the page so that hyperlinks will be displayed in accordance with the display parameters, and delivers the page to the client computer. The client computer then displays the page to the user. If the page server is dynamically generating a requested page, the page server may issue multiple calls to the prominence server to obtain prominence data as needed, before and/or during the process of generating the page. Alternatively, a page server may obtain prominence data for the display of hyperlinks and modify the page on which they appear after the page has been generated by the page server. The prominence data provided by the prominence server in response to a request from the page server reflects prior user interaction with the hyperlinks. Accordingly, the prominence server may act as a provider of a Web service to page servers to allow them to provide a display of hyperlinks in accordance with user interaction data and algorithms stored by the prominence server. The prominence server may provide a standard interface that any page server can use to obtain prominence data.

The "display" of a hyperlink may also encompass any form of presentation of the hyperlink to a user. This includes forms of visual presentation as well as aural, haptic, or other presentation. For example, in regard to aural presentation, display parameters including (but not limited to) speed, voice, pitch, and/or volume may be used. Further, any kind of wired or wireless device capable of presenting information, including but not limited to devices such as computers, personal digital assistants, mobile telephones, Internet-enabled automobiles, electronic Braille readers, digital media players, and many more, may be used to present the hyperlink to a user.

Moreover, hyperlinks are in no way limited to the World Wide Web. A "hyperlink" may encompass any kind of hypertext link in any hypertext system or method. It may further encompass other kinds of computerized, digital, or electronic links having presentations in any form and in any medium, representing unidirectional, bidirectional, or multi-way association pathways between or among items such as, but not limited to, software programs, software objects, data structures, databases, digital content (text, audio, video, electronic games, virtual reality, etc.), stores of information, Web services, and so forth; and these association pathways may be mediated by any software and hardware in any combination known or hereafter developed, including but not limited to any kind of computer system or computer network.

Accordingly, embodiments of the present invention may include further exemplary methods that may be used to facilitate a presentation of a link. As one example, a method may be implemented that includes first obtaining a value based on information concerning a prior interaction with a link, and then using the value to determine a parameter affecting a presentation of the link at one of three or more levels of prominence. A link may assume a variety of different forms. In a broad aspect, a link may be a computerized, electronic, or digital link between a first item and a second item. In such cases, the link may point from the first item to the second item, for example, or it may point from the second item to the first item. In some cases, the first item may be associated with a first node in a computer network and the second item may associated with a second node in the computer network. Persons having ordinary skill in the art of computer networking will recognize there exists a myriad of computer network configurations in which systems, devices, apparatus, processes, interfaces, services, etc. can be made accessible as nodes in the computer network. The link may also be configured to represent an association among at least three distinct items.

Many of the exemplary embodiments discussed herein refer to implementations that provide information retrieval and display via the World Wide Web. A link, as contemplated in these embodiments, may thus be a hyperlink in a hypertext system, wherein the hypertext system comprises the World Wide Web. In some circumstances, the link may represent an association between at least two digital documents. In yet other circumstances, the link may represent an association between at least two Web services.

As previously noted, an exemplary method may include obtaining a value based on information concerning a prior interaction with a link, and then using the value to determine a parameter affecting a presentation of the link. In that regard, for one example, the prior interaction may be a prior interaction between a user and the link. Where desired, the presentation may be made perceivable by a user which as noted above may include visual, aural, haptic or other perception by a user.

The prior interaction may comprise a prior selection of the link by the user, though that is not necessarily the case. For example, the link may be a link in a hypertext system and the prior interaction may comprise a click-through of the link by the user. Alternatively, the interaction may comprise a prior indication, without selection, of the link by the user. One form of indication may be a time or proximity at which a user places a movable pointer relative to link in a display. For example, a user operating a mouse or the like may place a pointer such that it "hovers" over a link. Such hovering may result in an indication of the link by the user.

In another aspect, a link may be presented in a page that includes the link and one or more other elements. Other elements, in the context of a Web implementation, may include things like text, graphics, buttons, forms, checkboxes, media playback, speech and sound effects, etc. In such a case, information concerning prior interaction that is used when determining a parameter affecting a presentation of a link may include interaction with an element of the page other than a link. A page may also be presented that includes the link and one or more other links. In such a case, the prior interaction information may include interaction with one of the other links in the page. In yet other circumstances, where a page is presented including the link, the prior interaction information may include perception by a user of a prior presentation of the page.

In addition to obtaining a value based on prior interaction with a link and determining a parameter affecting a presentation of the link, an embodiment may further comprise facilitating a presentation of the link in which the link is presented at one of the three or more levels of prominence in accordance with the determined parameter. Typically, though not required, the presentation of the link is made perceivable by a human being.

Yet additional embodiments of the invention may include further exemplary systems that facilitate a presentation of a link. As one example, a system may be implemented that includes a first element configured to provide a presentation parameter based on prominence data associated with a link, and a second element in communication with the first element, configured to receive the presentation parameter from the first element and to facilitate a presentation of the link at any of three or more levels of prominence in accordance with the presentation parameter. The link may typically be a hyperlink in a hypertext page. The second element of the system may be configured to modify the presentation of the link in a page in accordance with the parameter such that the presentation occurs at one of three or more levels of prominence. In one exemplary embodiment, the first element of the system comprises a server computer. In the same or a different embodiment, the second element may comprise a device having a display.

The aforementioned system may further comprise a third element in communication with the first element, in which the third element is configured to provide prominence data to the first element. An example of a third element in this regard may be a database of prominence data.

A system may further comprise a fourth element in communication with the third element as described above. The fourth element in this regard may be configured to compute the prominence data and to provide the computed prominence data to the third element.

Links may also be organized into a hierarchy, such as a family or tree, in which relationships are used to define the connections between nodes in the hierarchy. For example, a resource that is the target of a link may be a detail page for a book by a certain author. This link may belong to a family of links that all have target resources pertaining to the same author. Moreover, this family of links may belong to a larger family of links that target detail pages for a larger collection of books. Embodiments of the invention may be constructed in which user interaction with a resource, such as a detail page for a book in this example, may affect the prominence of display of other hyperlinks having a relationship with the link and the user-interacted resource that it targets. Prominence data for one link in the hierarchy may affect the prominence of display of other associated links in the hierarchy. In this manner, for example, the popularity of a link or a resource that the link targets may be observed more broadly in the prominence of display of other associated links in the hierarchy.

As will be appreciated from the foregoing, implementations of the present invention may encompass a broad spectrum of systems, methods and computer-accessible media that are useful in affecting the display of a link. The specific exemplary embodiments discussed herein are to assist in understanding aspects of the present invention, and should not be used to limit the scope of the invention. The scope of the invention should be determined from the following claims and equivalents thereto.

What is claimed is:

1. A computer-implemented method for affecting a level of prominence at which a hyperlink is displayed, comprising:
   monitoring user interaction with a hyperlink that points to a resource, wherein the hyperlink appears in multiple different pages that are displayable to one or more users;
   aggregating a count of click-throughs of the hyperlink in the multiple different pages to produce information concerning user interaction with the hyperlink across the multiple pages, wherein the information concerning user interaction includes a count of page views on which the hyperlink appears and feedback from the one or more users of the hyperlink, the feedback including a submission indicating the usefulness of the resource;
   calculating a score based on the information concerning user interaction with the hyperlink by adding the count of click-throughs to a value derived from the feedback, and dividing the result by the count of page views;
   determining a parameter that affects a level of prominence at which the hyperlink is displayed according to the calculated score; and
   storing the parameter for responding to a subsequent request for the parameter.

2. The method of claim 1, wherein the score is calculated based on information concerning interaction of one or more users other than a current user.

3. The method of claim 1, wherein the count of page views is an aggregated count of page views of the pages on which the hyperlink appears.

4. The method of claim 3, wherein the aggregated count of page views is incremented in a user session when a page on which the hyperlink appears is displayed, unless the page has previously been displayed in the same user session.

5. The method of claim 1, wherein the aggregated count of click-throughs is incremented in a user session when the user clicks on the hyperlink, unless the user has previously clicked on the hyperlink in the same user session.

6. The method of claim 1, wherein the information concerning user interaction is an aggregate of information from users in a defined group of users that is fewer than all users having access to a page on which the hyperlink appears.

7. The method of claim 6, wherein the defined group of users is identified by a group identifier.

8. The method of claim 6, wherein the aggregated count of click-throughs of the hyperlink is incremented in a user session when a user in the group clicks on the hyperlink, unless the user has previously clicked on the hyperlink in the same user session.

9. The method of claim 8, wherein the count of page views is incremented in a user session when a page on which the hyperlink appears is displayed to a user in the group, unless the page has previously been displayed to the user in the same user session.

10. The method of claim 6, wherein the information concerning user interaction is aggregated for multiple groups of users.

11. The method of claim 1, wherein the hyperlink appears on a page that is only locally accessible by an individual user, and wherein the information concerning user interaction includes information pertaining only to the individual user's interaction with the hyperlink on the locally accessible page.

12. The method of claim 1, wherein the parameter affects which one of three or more levels of prominence at which the hyperlink is displayed.

13. The method of claim 1, wherein the score decays over time.

14. The method of claim 1, further comprising affecting the level of prominence at which the hyperlink is displayed if a period of time passes without a click-through of the hyperlink.

15. The method of claim 3, further comprising setting an expiration time for a page view in the count of page views, thereby causing the count of page views to decrease when the page view expires.

16. The method of claim 1, further comprising setting an expiration time for a click-through in the count of click-throughs, thereby causing the count of click-throughs to decrease when the click-through expires.

17. The method of claim 1, wherein the feedback is provided as a positive indication or a negative indication.

18. The method of claim 1, wherein the feedback is provided as a rating on a scale of values.

19. The method of claim 1, wherein the feedback is provided as a percentage of helpfulness.

20. A computer-implemented method for affecting a level of prominence at which a hyperlink is displayed, comprising:
calculating a score based on information concerning interaction of one or more users with a hyperlink, wherein the information concerning user interaction includes:
a count of click-throughs of the hyperlink;
a count of page views of a page on which the hyperlink appears; and
feedback from the user of the hyperlink indicating whether the hyperlink was helpful;
determining a parameter that affects a level of prominence at which the hyperlink is displayed according to the calculated score; and
storing the parameter for responding to a request for the parameter;
wherein the score is calculated by dividing a sum of the count of click-throughs and a value derived from the feedback by the count of page views.

21. A computer-implemented method for affecting a level of prominence at which a hyperlink is displayed, comprising:
calculating a score based on information concerning interaction of one or more users with a hyperlink over multiple user sessions, wherein the information concerning user interaction with a hyperlink is collected once per user session for a given hyperlink and includes a count of click-throughs, a count of page views, and feedback received from the one or more users; wherein the feedback comprises a user submission; and wherein the score is the count of click-throughs plus a value derived from the feedback divided by the count of page views;
determining a parameter that affects a level of prominence at which the hyperlink is displayed according to the calculated score; and
storing the parameter for responding to a request for the parameter.

22. The method of claim 21, wherein the count of page views is incremented in a user session when the page is displayed, unless the page has previously been displayed in the same user session.

23. The method of claim 21, wherein the count of page views is set to a lower value after a number of page views occur without any click-throughs.

24. The method of claim 21, wherein the count of click-throughs is set to a lower value after a number of page views occur without any click-throughs.

25. A system for affecting a level of prominence at which a hyperlink is displayed, comprising:
a prominence data store configured to store information concerning interaction of one or more users with the hyperlink, the information including a count of click-throughs of the hyperlink, a count of page views of at least one page on which the hyperlink is displayed, and feedback from the one or more users, wherein the feedback includes a percentage submitted by the one or more users indicating a utility of the hyperlink;
a computing device in communication with the prominence data store, wherein the computing device includes a memory and a processor, and is configured to:
generate, using the processor, a score based on the information concerning interaction of the one or more users with the hyperlink, wherein the score is the count of click-throughs plus a value derived from the feedback divided by the count of page views; and
use the score to generate a parameter that affects a level of prominence at which the hyperlink is displayed.

26. The system of claim 25, wherein the score decays over time.

27. The system of claim 25, wherein the score is generated based on information concerning interaction of one or more users other than a current user.

28. The system of claim 25, wherein the level of prominence at which the hyperlink is displayed is affected if a period of time passes without a click-through of the hyperlink.

29. The system of claim 25, wherein the count of page views is set to a lower value after a number of page views occur without any click-throughs.

30. The system of claim 25, wherein the count of click-throughs is set to a lower value after a number of page views occur without any click-throughs.

31. A computer-readable medium having executable instructions stored thereon, wherein the instructions, when executed by a computer, cause the computer to:
monitor user interaction with a hyperlink that points to a resource, wherein the hyperlink appears in multiple different pages that are displayable to one or more users;
aggregate a count of click-throughs of the hyperlink in the multiple different pages to produce information concerning user interaction with the hyperlink across the multiple pages, wherein the information concerning user interaction includes a count of page views on which the hyperlink appears and feedback from the one or more users of the hyperlink; wherein the feedback comprises a user-submitted rating;
calculate a score based on the information concerning user interaction with the hyperlink by adding the count of click-throughs to a value derived from the feedback to produce a sum, and dividing the sum by the count of page views; and
determine a parameter that affects a level of prominence at which the hyperlink is displayed according to the calculated score.

* * * * *